(12) United States Patent
Branagan et al.

(10) Patent No.: US 8,986,472 B2
(45) Date of Patent: Mar. 24, 2015

(54) GLASSY NANO-MATERIALS

(75) Inventors: Daniel James Branagan, Idaho Falls, ID (US); Brian E. Meacham, Idaho Falls, ID (US); Jason K. Walleser, Idaho Falls, ID (US); Alla V. Sergueeva, Idaho Falls, ID (US); Andrew T. Ball, Ammom, ID (US); Grant G. Justice, Idaho Falls, ID (US)

(73) Assignee: The NanoSteel Company, Inc., Providence, RI (US)

( * ) Notice: Subject to any disclaimer, the term of this patent is extended or adjusted under 35 U.S.C. 154(b) by 0 days.

(21) Appl. No.: 13/287,559

(22) Filed: Nov. 2, 2011

(65) Prior Publication Data

US 2012/0103477 A1 May 3, 2012

Related U.S. Application Data

(60) Provisional application No. 61/409,374, filed on Nov. 2, 2010.

(51) Int. Cl.
   C21D 1/84 (2006.01)
   C22C 45/02 (2006.01)

(52) U.S. Cl.
   CPC ............ *C22C 45/02* (2013.01); *C21D 2201/03* (2013.01)
   USPC ........... 148/539; 148/538; 148/540; 148/403; 148/561

(58) Field of Classification Search
   USPC .......................... 148/538, 539, 540, 403, 561
   See application file for complete search history.

(56) References Cited

U.S. PATENT DOCUMENTS

| | | | |
|---|---|---|---|
| 4,365,994 A | 12/1982 | Ray | |
| 5,395,460 A * | 3/1995 | Martis | ............................ 148/121 |
| 2006/0213586 A1 | 9/2006 | Kui | |
| 2007/0187010 A1 | 8/2007 | Baker et al. | |
| 2009/0184705 A1 * | 7/2009 | Yoshizawa | .................... 324/142 |
| 2010/0111747 A1 | 5/2010 | Branagan et al. | |
| 2010/0154942 A1 | 6/2010 | Branagan et al. | |
| 2010/0197202 A1 | 8/2010 | Branagan et al. | |
| 2011/0108166 A1 | 5/2011 | Branagan et al. | |

OTHER PUBLICATIONS

Lee, "Deformation behavior of strip-cast bulk amorphous matrix composites containing various crystalline particles," Materials Science and Engineering A 449-451 (2007) 176-180.
Hofmann, "Designing metallic glass matrix composites with high toughness and tensile ductility," Nature 451 (2008) 1085 (6 pages).
Chen, "Free-volume-induced enhancement of plasticity in a monolithic bulk metallic glass at room temperature," Scripta Materialia 59 (2008) 75-78.
Lee, "Extraordinary plasticity of an amorphous alloy based on atomistic-scale phase separation," Materials Science and Engineering A 485 (2008) 61-65.

(Continued)

*Primary Examiner* — Rebecca Lee
(74) *Attorney, Agent, or Firm* — Grossman, Tucker, Perreault & Pfleger, PLLC

(57) ABSTRACT

The present invention is directed at metal alloys that are capable of forming spinodal glass matrix microconstituent structure. The alloys are iron based and include nickel, boron, silicon and optionally chromium. The alloys exhibit ductility and relatively high tensile strengths and may be in the form of sheet, ribbon, wire, and/or fiber. Applications for such alloys are described.

8 Claims, 18 Drawing Sheets

(56) References Cited

OTHER PUBLICATIONS

Kim, "Work hardening ability of ductile Ti45Cu40Ni7.5Zr5Sn2.5 and CU47.5Zr47.5Al5 bulk metallic glasses," Applied Physics Letters 89, 071908 (2006) (3 Pages).

Johnson, "Bulk Glass-Forming Metallic Alloys: Science and Technology," MRS Bull. 24 (1999), 42-56.

Inoue, "Stabilization of Metallic Supercooled Liquid and Bulk Amorphous Alloys," Acta mater. 48 (2000) 279-306.

Greer, "Bulk Metallic Glasses: At the Cutting Edge of Metals Research," MRS Bulletin 32 (2007), 611.

Yao, "Superductile bulk metallic glass," Applied Physics Letters 88, 122106 (2006) (3 Pages).

Das, "'Work-Hardenable' Ductile Bulk Metallic Glass," Phys. Rev. Lett. 94 (2005) 205501 (4 Pages).

Kim, "Role of nanometer-scale quasicrystals in improving the mechanical behavior of Ti-based bulk metallic glasses," Appl. Phys. Lett. 83 (2003) 3093-3095.

Fan, "Ductility of bulk nanocrystalline composites and metallic glasses at room temperature,"Appl. Phys. Lett. 77 (2000) 46-48.

Qin,"Mechanical properties and corrosion behavior of (Cu0.6Hf0.25Ti0.15)90Nb10 bulk metallic glass composites," Materials Science and Engineering A449-451 (2007) 230-234.

Chen, Deformation-induced nanocrystal formation in shear bands of amorphous alloys Nature 367 (1994), 541-543.

Hays, "Microstructure Controlled Shear Band Pattern Formation and Enhanced Plasticity of Bulk Metallic Glasses Containing in situ Formed Ductile Phase Dendrite Dispersions," Phys. Rev. Lett. 84 (2000), 2901-2904.

He, "Novel Ti-base nanostructure-dendrite composite with enhanced plasticity," Nature Mater. 2 (2003) 33-37.

Szuecs, "Mechanical Properties of Zr56.2 Ti13.8 Nb5.0 Cu6.9 Ni5.6 Be12.5 Ductile Phase Reinforced Bulk Metallic Glass Composite," Acta Mater. 49 (2001) 1507-1513.

Eckert, "Strengthening of multicomponent glass-forming alloys by microstructure design," Journal of Non-Crystalline Solids 353 (2007) 3742-3749.

Fan,"Metallic glass matrix composite with precipitated ductile reinforcement," Appl. Phys. Lett. 81 (2002) 1020-1022.

Sergueeva, et al., "Gage length and sample size effect on measured properties during tensile testing," Materials Science and Engineering A 526 (2009) 79-83.

International Search Report and Written Opinion dated Mar. 13, 2012 issued in related International Patent Application No. PCT/US11/58563.

* cited by examiner

US 8,986,472 B2

GLASSY NANO-MATERIALS

CROSS-REFERENCE TO RELATED APPLICATIONS

This application claims the benefit of U.S. Provisional Application Ser. No. 61/409,374 filed Nov. 2, 2010, which is fully incorporated herein by reference.

FIELD OF INVENTION

The present application relates to processing conditions and chemistries of matter that may be applied to a variety of rapid solidification processing methods to yield improved properties such as tensile properties and ductility in iron based glass forming alloys.

BACKGROUND

Metallic glasses are a relatively unique class of materials that may exhibit characteristics which are both metal like, (since they may contain non-directional metallic bonds, metallic luster, and/or relatively significant electrical and thermal conductivity), and ceramic like (since relatively high hardness may often be exhibited coupled with brittleness and the lack of tensile ductility). Metallic glasses may be understood to include supercooled liquids that exist in solid form at room temperature but which may have structures that are similar to what is found in the liquid with only short range order present. Metallic glasses may generally have free electrons, exhibit metallic luster, and exhibit metallic bonding similar to what is found in conventional metals. Metallic glasses may be metastable materials and when heated up, they may transform into a crystalline state. The process is called crystallization or devitrification. Since diffusion is limited at room temperature, enough heat (i.e. Boltzman's Energy) may be applied to overcome the nucleation barrier to cause a solid-solid state transformation which is caused by glass devitrification.

SUMMARY

A metallic alloy comprising Fe at a level of 45.0 atomic percent to 71 atomic percent, Ni at a level of 4.0 atomic percent to 17.5 atomic percent, B at a level of 11.0 atomic percent to 16 atomic percent, Si at a level of 0.3 atomic percent to 4.0 atomic percent and optionally Cr present from 0.1 to 19.0 atomic percent. The alloy contains spinodal glass matrix microconstituent (SGMM) structure present in the range of 5.0% to 95.0% by volume therein defining two phases with different chemical composition wherein the SGMM structure includes one or more semicrystalline or crystalline phases wherein the semicrystalline phase comprises clusters exhibiting a largest linear dimension of 2.0 nm or less and the crystalline phase comprises clusters exhibiting a largest linear dimension of greater than 2.0 nm and a glass matrix where the structural units in the glass phase have a size of 5 Å to 100 Å. The alloy has an ultimate tensile strength of 0.4 GPa to 3.9 GPa and tensile elongation of 0.4% to 5.5%.

In method form, the present invention is directed at a method for forming a metallic alloy containing spinodal glass matrix microconstituent (SGMM) comprising: supplying a metallic alloy comprising Fe at a level of 45.0 atomic percent to 71 atomic percent; Ni at a level of 4.0 atomic percent to 17.5 atomic percent; B at a level of 11.0 atomic percent to 16 atomic percent; and Si at a level of 0.3 atomic percent to 4.0 atomic percent and optionally Cr present from 0.1 to 19.0 atomic percent. This may then be followed by melting the alloy and cooling and forming the spinodal glass matrix microconstituent wherein the metal alloy upon cooling separates into two distinct phases that are different in chemical composition and physical properties, wherein the phase formation is not nucleation controlled and the SGMM structure includes one or more semicrystalline or crystalline phases wherein the semicrystalline phase comprises clusters exhibiting a largest linear dimension of 2.0 nm or less and the crystalline phase comprises clusters exhibiting a largest linear dimension of greater than 2.0 nm and a glass matrix where the structural units in the glass phase have a size of 5 Å to 100 Å. Such alloy may again have an ultimate tensile strength of 0.4 GPa to 3.9 GPa and tensile elongation of 0.4% to 5.5%.

BRIEF DESCRIPTION OF THE DRAWINGS

The above mentioned and other features of this disclosure, and the manner of attaining them, may become more apparent and better understood by reference to the following description of embodiments described herein taken in conjunction with the accompanying drawings, wherein.

DETAILED DESCRIPTION

Figure 1:
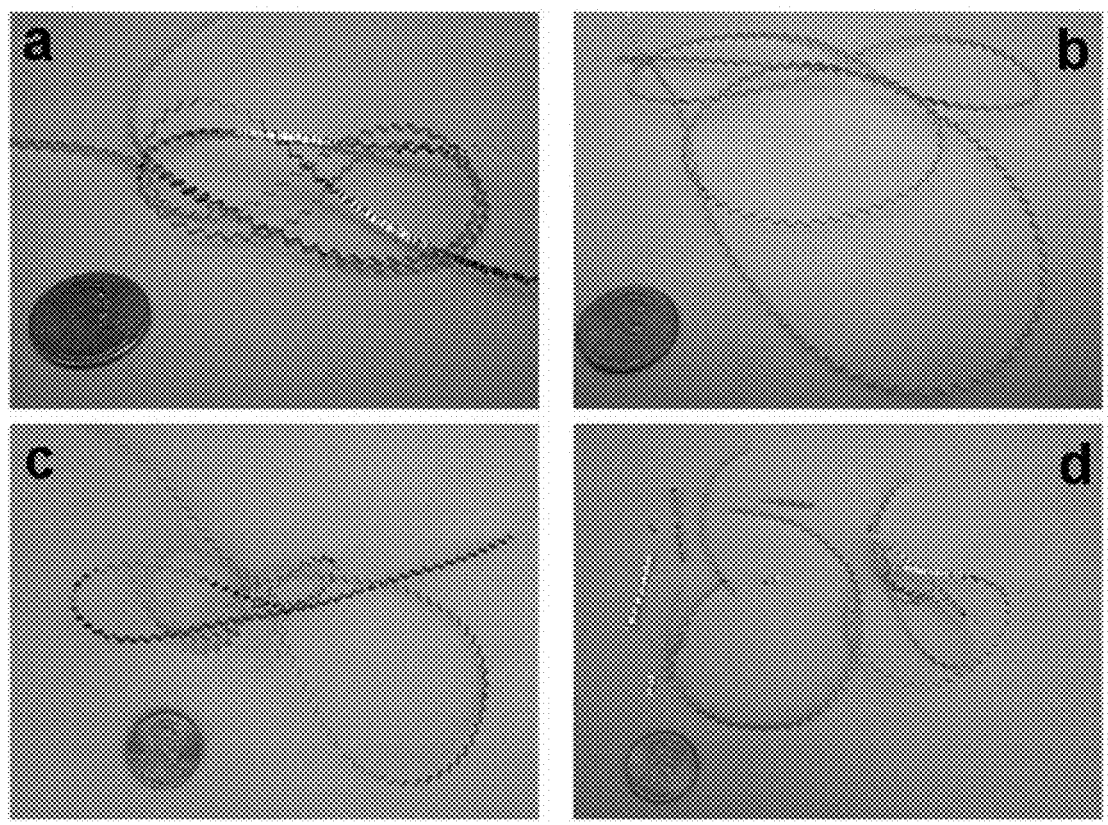
FIG. 1 Example optical pictures of corrugated ribbon for each selected series; a) A2 corrugated ribbon, b) B4 corrugated ribbon, c) C6 corrugated ribbon, and d) D8 corrugated ribbon.

As noted above, metallic glasses may exhibit characteristics which are both metal like, (since they may contain non-directional metallic bonds, metallic luster, and relatively significant electrical and thermal conductivity), and ceramic like (since relatively high hardness may often be exhibited coupled with brittleness and the lack of tensile ductility). Metallic glasses may be understood to include supercooled liquids that exist in solid form at room temperature but which may have structures that are similar to what is found in the liquid with only short range order present. Metallic glasses may generally have free electrons, exhibit metallic luster, and exhibit metallic bonding similar to what is found in conventional metals. Metallic glasses may be understood to be metastable materials and when heated up, they may transform into a crystalline state through crystallization or devitrification. Since diffusion may be limited at room temperature, enough heat (i.e. Boltzman's Energy) may be to be applied to overcome the nucleation barrier to cause a solid-solid state transformation which is caused by glass devitrification.

The devitrification temperature of metallic glasses can vary widely and may be, for example, in the range of 300° C. to 800° C. with enthalpies of crystallization commonly from −25 J/g to −250 J/g. The devitrification process can occur in one or multiple stages. When occurring in multiple stages, a crystalline phase may be formed and then depending on the specific partition coefficient, atoms may either be attracted to the new crystallites or rejected into the remaining volume of the glass. This may result in more stable glass chemistry which may necessitate additional heat input to cause partial or full devitrification. Thus, partially devitrified structures may result in crystalline precipitates in a glass matrix. Commonly, these precipitates may be in the size range of 30 nm to 125 nm. Full devitrification to a completely crystalline state may result from heat treating above the highest temperature glass peak which can be revealed through thermal analysis such as differential scanning calorimetry or differential thermal analysis.

The relatively fine length scale of the structural order, (i.e. molecular associations), and near defect free nature of the material, (i.e. no 1-d dislocation or 2-d grain/phase boundary defects), may provide relatively high strength, (and corresponding hardness), which may be on the order of 33% to 45% of theoretical. However, due to the lack of crystallinity, dislocations may not be found and a mechanism for significant (i.e. >1%) tensile elongation may not be apparent. Metallic glasses may exhibit limited fracture toughness associated with the relatively rapid propagation of shear bands and/or cracks which may be a concern for the technological utilization of these materials. While these materials may show adequate ductility when tested in compression, when tested in tension they exhibit elongation very close to zero and fracture in the brittle manner. The inherent inability of these classes of materials to deform in tension at room temperature may be a limiting factor for all potential structural applications where intrinsic ductility is needed to avoid catastrophic failure. Owing to strain softening and/or thermal softening, plastic deformation of metallic glasses may be relatively highly localized into shear bands, resulting in a limited plastic strain (exhibiting less than 1% elongation) and catastrophic failure at room temperature.

Spinodal Glass Matrix Microconstituent (i.e. SGMM) may enable the achievement of ductility (≥1% elongation) arising from the ability to blunt moving shear bands (i.e. ISBB) through specific microstructural interactions at the nanoscale called Localized Deformation Induced Changes (LDIC). Subsequent second level and higher arresting shear band interactions (SBAI), may allow the achievement of relatively high shear band densities under unconstrained loading and may lead to increased levels of global plasticity. Moreover, the result of this SBAI may include the development of a strain hardening effect which means that the active ductility mechanisms may be usable and relevant to industrial processing and applications where defects and the associated stress concentration sites will always be present. The chemistries described herein may now achieve the formation of spinodal glass matrix microconstituents at a relatively lower cost and may therefore enhance the price/performance benefits to enable an expanded range of commercial markets for materials that include spinodal glass matrix microconstituents.

Accordingly, the present application relates to glass forming chemistries which may lead to Spinodal Glass Matrix Microconstituent (SGMM) structures, which may exhibit relatively significant ductility and high tensile strength. Spinodal glass matrix microconstituents may be understood as microconstituents formed by a transformation mechanism that is not nucleation controlled. More basically, spinodal decomposition may be understood as a mechanism by which a solution of two or more components (e.g. metal compositions) of the alloy can separate into distinct regions (or phases) with distinctly different chemical compositions and physical properties. This mechanism differs from classical nucleation in that phase separation occurs uniformly throughout the material and not just at discrete nucleation sites. The phases may include one or more semicrystalline clusters or crystalline phases, which may therefore form through a successive diffusion of atoms on a local level until the chemistry fluctuations lead to at least one distinct crystalline phase. Semi-crystalline clusters may be understood herein as exhibiting a largest linear dimension of 2 nm or less, whereas crystalline clusters may exhibit a largest linear dimension of greater than 2 nm. Note that during the early stages of the spinodal decomposition, the clusters which are formed may be relatively small and while their chemistry differs from a surrounding glass matrix, they are not yet fully crystalline and have not yet achieved well ordered crystalline periodicity. Additional crystalline phases may exhibit the same crystal structure or distinct structures. Furthermore, as noted, the phases may include a glass matrix. The glass matrix may be understood to include microstructures that may exhibit associations of structural units in the solid phase that may be randomly packed together. The level of refinement, or the size, of the structural units in the glass phase may be in the angstrom scale range (i.e. 5 Å to 100 Å).

In addition, the alloys may exhibit Induced Shear Band Blunting (ISBB) and Shear Band Arresting Interactions (SBAI) which may be enabled by the spinodal glass matrix microconstituent (SGMM). ISBB may be understood as the ability to blunt and stop propagating shear bands through interactions with the SGMM structure. SBAI may be understood as the arresting of shear bands through shear band/shear band interactions and may occur after the initial or primary shear bands are blunted through ISBB.

While conventional materials may deform through dislocations moving on specific slip systems in crystalline metals, ISBB and SBAI deformation mechanisms may involve moving shear bands (i.e., discontinuities where localized deformation occurs) in a spinodal glass matrix microconstituent, which are blunted by localized deformation induced changes (LDIC) described further herein. With increasing levels of stress, once a shear band is blunted, new shear bands may be nucleated and then interact with existing shear bands creating relatively high shear band densities in tension and the development of relatively significant levels of global plasticity. Thus, the alloys with favorable SGMM structures may prevent or mitigate shear band propagation in tension, which may result in relatively significant tensile ductility (>1%) and lead to strain hardening during tensile testing. The alloys contemplated herein may include or consist of chemistries capable of forming a spinodal glass matrix microconstituent, wherein the spinodal glass matrix microconstituents may be present in the range of 5.0% to 95% by volume, including glassy, semi-crystalline, and/or crystalline phases.

Glass forming chemistries that may be used to form compositions including the spinodal glass matrix microconstituent structures may include certain iron based glass forming alloys, which are then processed to provide the SGMM structures noted herein. The iron based alloys may include iron present at levels of greater than or equal to 45 atomic %. In addition, the alloys may include the elements nickel, boron, silicon and optionally chromium. In some embodiments, the alloys may consist essentially of or may be limited only to iron, nickel, boron, silicon and optionally chromium. In further embodiments, the alloys do not include cobalt, which would otherwise increase the relative cost of the alloy compositions.

In some embodiments, the alloys may include iron present in the range of 45 atomic percent to 71 atomic percent, nickel present in the range of 4 atomic percent to 17.5 atomic percent, boron present in the range of 11 atomic percent to 16 atomic percent, silicon present in the range of 0.3 atomic percent to 4.0 atomic percent and optionally chromium present in the range of 0.1 atomic percent to 19 atomic percent. The compositions of the alloys may vary at all values and increments in the above described ranges.

Therefore, iron may be selected from the following values of 45.0 atomic percent (at. %), 45.1 at. %, 45.2 at. %, 45.3 at. %, 45.4 at. %, 45.6 at. %, 45.7 at. %, 45.8 at. %, 45.9 at. %, 46.0 at. %, 46.1 at. %, 46.2 at. %, 46.3 at. %, 46.4 at. %, 46.5 at. %, 46.7 at. %, 46.8 at. %, 46.9 at. %, 47.0 at. %, 47.1 at. %, 47.2 at. %, 47.3 at. %, 47.4 at. %, 47.5 at. %, 47.6 at. %, 47.7 at. %, 47.8 at. %, 47.9 at. %, 48 at. %, 48.1 at. %, 48.2 at. %, 48.3 at. %, 48.4 at. %, 48.5 at. %, 48.6 at. %, 48.7 at. %, 48.8 at. %, 48.9 at. %, 49 at. %, 49.1 at. %, 49.2 at. %, 49.3 at. %, 49.4 at. %, 49.5 at. %, 49.6 at. %, 49.7 at. %, 49.8 at. %, 49.9 at. %, 50 at. %, 50.1 at. %, 50.2 at. %, 50.3 at. %, 50.4 at. %, 50.5 at. %, 50.6 at. %, 50.7 at. %, 50.8 at. %, 50.9 at. %, 51 at. %, 51.1 at. %, 51.2 at. %, 51.3 at. %, 51.4 at. %, 51.5 at. %, 51.6 at. %, 51.7 at. %, 51.8 at. %, 51.9 at. %, 52 at. %, 52.1 at. %, 52.2 at. %, 52.3 at. %, 52.4 at. %, 52.5 at. %, 52.6 at. %, 52.7 at. %, 52.8 at. %, 52.9 at. %, 53 at. %, 53.1 at. %, 53.2 at. %, 53.3 at. %, 53.4 at. %, 53.5 at. %, 53.6 at. %, 53.7 at. %, 53.8 at. %, 53.9 at. %, 54 at. %, 54.1 at. %, 54.2 at. %, 54.3 at. %, 54.4 at. %, 54.5 at. %, 54.6 at. %, 54.7 at. %, 54.8 at. %, 54.9 at. %, 55 at. %, 55.1 at. %, 55.2 at. %, 55.3 at. %, 55.4 at. %, 55.5 at. %, 55.6 at. %, 55.7 at. %, 55.8 at. %, 55.9 at. %, 56 at. %, 56.1 at. %, 56.2 at. %, 56.3 at. %, 56.4 at. %, 56.5 at. %, 56.6 at. %, 56.7 at. %, 56.8 at. %, 56.9 at. %, 57 at. %, 57.1 at. %, 57.2 at. %, 57.3 at. %, 57.4 at. %, 57.5 at. %, 57.6 at. %, 57.7 at. %, 57.8 at. %, 57.9 at. %, 58 at. %, 58.1 at. %, 58.2 at. %, 58.3 at. %, 58.4 at. %, 58.5 at. %, 58.6 at. %, 58.7 at. %, 58.8 at. %, 58.9 at. %, 59 at. %, 59.1 at. %, 59.2 at. %, 59.3 at. %, 59.4 at. %, 59.5 at. %, 59.6 at. %, 59.7 at. %, 59.8 at. %, 59.9 at. %, 60 at. %, 60.1 at. %, 60.2 at. %, 60.3 at. %, 60.4 at. %, 60.5 at. %, 60.6 at. %, 60.7 at. %, 60.8 at. %, 60.9 at. %, 61 at. %, 61.1 at. %, 61.2 at. %, 61.3 at. %, 61.4 at. %, 61.5 at. %, 61.6 at. %, 61.7 at. %, 61.8 at. %, 61.9 at. %, 62 at. %, 62.1 at. %, 62.2 at. %, 62.3 at. %, 62.4 at. %, 62.5 at. %, 62.6 at. %, 62.7 at. %, 62.8 at. %, 62.9 at. %, 63 at. %, 63.1 at. %, 63.2 at. %, 63.3 at. %, 63.4 at. %, 63.5 at. %, 63.6 at. %, 63.7 at. %, 63.8 at. %, 63.9 at. %, 64 at. %, 64.1 at. %, 64.2 at. %, 64.3 at. %, 64.4 at. %, 64.5 at. %, 64.6 at. %, 64.7 at. %, 64.8 at. %, 64.9 at. %, 65 at. %, 65.1 at. %, 65.2 at. %, 65.3 at. %, 65.4 at. %, 65.5 at. %, 65.6 at. %, 65.7 at. %, 65.8 at. %, 65.9 at. %, 66 at. %, 66.1 at. %, 66.2 at. %, 66.3 at. %, 66.4 at. %, 66.5 at. %, 66.6 at. %, 66.7 at. %, 66.8 at. %, 66.9 at. %, 67 at. %, 67.1 at. %, 67.2 at. %, 67.3 at. %, 67.4 at. %, 67.5 at. %, 67.6 at. %, 67.7 at. %, 67.8 at. %, 67.9 at. %, 68 at. %, 68.1 at. %, 68.2 at. %, 68.3 at. %, 68.4 at. %, 68.5 at. %, 68.6 at. %, 68.7 at. %, 68.8 at. %, 68.9 at. %, 69 at. %, 69.1 at. %, 69.2 at. %, 69.3 at. %, 69.4 at. %, 69.5 at. %, 69.6 at. %, 69.7 at. %, 69.8 at. %, 69.9 at. %, 70 at. %, 70.1 at. %, 70.2 at. %, 70.3 at. %, 70.4 at. %, 70.5 at. %, 70.6 at. %, 70.7 at. %, 70.8 at. %, 70.9 at. %, and/or 71 at. %.

Nickel may be selected from the following values of 4.0 at. %, 4.1 at. %, 4.2 at. %, 4.3 at. %, 4.4 at. %, 4.5 at. %, 4.6 at. %, 4.7 at. %, 4.8 at. %, 4.9 at. %, 5 at. %, 5.1 at. %, 5.2 at. %, 5.3 at. %, 5.4 at. %, 5.5 at. %, 5.6 at. %, 5.7 at. %, 5.8 at. %, 5.9 at. %, 6 at. %, 6.1 at. %, 6.2 at. %, 6.3 at. %, 6.4 at. %, 6.5 at. %, 6.6 at. %, 6.7 at. %, 6.8 at. %, 6.9 at. %, 7 at. %, 7.1 at. %, 7.2 at. %, 7.3 at. %, 7.4 at. %, 7.5 at. %, 7.6 at. %, 7.7 at. %, 7.8 at. %, 7.9 at. %, 8 at. %, 8.1 at. %, 8.2 at. %, 8.3 at. %, 8.4 at. %, 8.5 at. %, 8.6 at. %, 8.7 at. %, 8.8 at. %, 8.9 at. %, 9 at. %, 9.1 at. %, 9.2 at. %, 9.3 at. %, 9.4 at. %, 9.5 at. %, 9.6 at. %, 9.7 at. %, 9.8 at. %, 9.9 at. %, 10 at. %, 10.1 at. %, 10.2 at. %, 10.3 at. %, 10.4 at. %, 10.5 at. %, 10.6 at. %, 10.7 at. %, 10.8 at. %, 10.9 at. %, 11 at. %, 11.1 at. %, 11.2 at. %, 11.3 at. %, 11.4 at. %, 11.5 at. %, 11.6 at. %, 11.7 at. %, 11.8 at. %, 11.9 at. %, 12 at. %, 12.1 at. %, 12.2 at. %, 12.3 at. %, 12.4 at. %, 12.5 at. %, 12.6 at. %, 12.7 at. %, 12.8 at. %, 12.9 at. %, 13 at. %, 13.1 at. %, 13.2 at. %, 13.3 at. %, 13.4 at. %, 13.5 at. %, 13.6 at. %, 13.7 at. %, 13.8 at. %, 13.9 at. %, 14 at. %, 14.1 at. %, 14.2 at. %, 14.3 at. %, 14.4 at. %, 14.5 at. %, 14.6 at. %, 14.7 at. %, 14.8 at. %, 14.9 at. %, 15 at. %, 15.1 at. %, 15.2 at. %, 15.3 at. %, 15.4 at. %, 15.5 at. %, 15.6 at. %, 15.7 at. %, 15.8 at. %, 15.9 at. %, 16.0 at. %, 16.1 at. %, 16.2 at. %, 16.3 at. %, 16.4 at. %, 16.5 at. %, 16.6 at. %, 16.7 at. %, 16.8 at. %, 16.9 at. %, 17.0 at. %, 17.1 at. %, 17.2 at. %, 17.3 at. %, 17.4 at. %, 17.5 at. %.

Boron may be selected from the following values of 11.0 at. %, 11.1 at. %, 11.2 at. %, 11.3 at. %, 11.4 at. %, 11.5 at. %, 11.6 at. %, 11.7 at. %, 11.8 at. %, 11.9 at. %, 12 at. %, 12.1 at. %, 12.2 at. %, 12.3 at. %, 12.4 at. %, 12.5 at. %, 12.6 at. %, 12.7 at. %, 12.8 at. %, 12.9 at. %, 13 at. %, 13.1 at. %, 13.2 at. %, 13.3 at. %, 13.4 at. %, 13.5 at. %, 13.6 at. %, 13.7 at. %, 13.8 at. %, 13.9 at. %, 14 at. %, 14.1 at. %, 14.2 at. %, 14.3 at. %, 14.4 at. %, 14.5 at. %, 14.6 at. %, 14.7 at. %, 14.8 at. %, 14.9 at. %, 15 at. %, 15.1 at. %, 15.2 at. %, 15.3 at. %, 15.4 at. %, 15.5 at. %, 15.6 at. %, 15.7 at. %, 15.8 at. %, 15.9 at. %, 16 at. %.

Silicon may be selected from the following values of 0.3 at. %, 0.4 at. %, 0.5 at. %, 0.6 at. %, 0.7 at. %, 0.8 at. %, 0.9 at. %, 1.0 at. %, 1.1 at. %, 1.2 at. %, 1.3 at. %, 1.4 at. %, 1.5 at. %, 1.6 at. %, 1.7 at. %, 1.8 at. %, 1.9 at. %, 2.0 at. %, 2.1 at. %, 2.2 at. %, 2.3 at. %, 2.4 at. %, 2.5 at. %, 2.6 at. %, 2.7 at. %, 2.8 at. %, 2.9 at. % 3.0 at. %, 3.1 at. %, 3.2 at. %, 3.3 at. %, 3.4 at. %, 3.5 at. %, 3.6 at. %, 3.7 at. %, 3.8 at. %, 3.9 at. % 4.0 at. %.

Chromium may be selected from the following values of 0 at. %, 0.1 at. %, 0.2 at. %, 0.3 at. %, 0.4 at. %, 0.5 at. %, 0.6 at. %, 0.7 at. %, 0.8 at. %, 0.9 at. %, 1 at. %, 1.1 at. %, 1.2 at. %, 1.3 at. %, 1.4 at. %, 1.5 at. %, 1.6 at. %, 1.7 at. %, 1.8 at.

%, 1.9 at. %, 2 at. %, 2.1 at. %, 2.2 at. %, 2.3 at. %, 2.4 at. %, 2.5 at. %, 2.6 at. %, 2.7 at. %, 2.8 at. %, 2.9 at. %, 3 at. %, 3.1 at. %, 3.2 at. %, 3.3 at. %, 3.4 at. %, 3.5 at. %, 3.6 at. %, 3.7 at. %, 3.8 at. %, 3.9 at. %, 4 at. %, 4.1 at. %, 4.2 at. %, 4.3 at. %, 4.4 at. %, 4.5 at. %, 4.6 at. %, 4.7 at. %, 4.8 at. %, 4.9 at. %, 5 at. %, 5.1 at. %, 5.2 at. %, 5.3 at. %, 5.4 at. %, 5.5 at. %, 5.6 at. %, 5.7 at. %, 5.8 at. %, 5.9 at. %, 6 at. %, 6.1 at. %, 6.2 at. %, 6.3 at. %, 6.4 at. %, 6.5 at. %, 6.6 at. %, 6.7 at. %, 6.8 at. %, 6.9 at. %, 7 at. %, 7.1 at. %, 7.2 at. %, 7.3 at. %, 7.4 at. %, 7.5 at. %, 7.6 at. %, 7.7 at. %, 7.8 at. %, 7.9 at. %, 8 at. %, 8.1 at. %, 8.2 at. %, 8.3 at. %, 8.4 at. %, 8.5 at. %, 8.6 at. %, 8.7 at. %, 8.8 at. %, 8.9 at. %, 9 at. %, 9.1 at. %, 9.2 at. %, 9.3 at. %, 9.4 at. %, 9.5 at. %, 9.6 at. %, 9.7 at. %, 9.8 at. %, 9.9 at. %, 10 at. %, 10.1 at. %, 10.2 at. %, 10.3 at. %, 10.4 at. %, 10.5 at. %, 10.6 at. %, 10.7 at. %, 10.8 at. %, 10.9 at. %, 11 at. %, 11.1 at. %, 11.2 at. %, 11.3 at. %, 11.4 at. %, 11.5 at. %, 11.6 at. %, 11.7 at. %, 11.8 at. %, 11.9 at. %, 12 at. %, 12.1 at. %, 12.2 at. %, 12.3 at. %, 12.4 at. %, 12.5 at. %, 12.6 at. %, 12.7 at. %, 12.8 at. %, 12.9 at. %, 13 at. %, 13.1 at. %, 13.2 at. %, 13.3 at. %, 13.4 at. %, 13.5 at. %, 13.6 at. %, 13.7 at. %, 13.8 at. %, 13.9 at. %, 14 at. %, 14.1 at. %, 14.2 at. %, 14.3 at. %, 14.4 at. %, 14.5 at. %, 14.6 at. %, 14.7 at. %, 14.8 at. %, 14.9 at. %, 15 at. %, 15.1 at. %, 15.2 at. %, 15.3 at. %, 15.4 at. %, 15.5 at. %, 15.6 at. %, 15.7 at. %, 15.8 at. %, 15.9 at. %, 16 at. %, 16.1 at. %, 16.2 at. %, 16.3 at. %, 16.4 at. %, 16.5 at. %, 16.6 at. %, 16.7 at. %, 16.8 at. %, 16.9 at. %, 17 at. %, 17.1 at. %, 17.2 at. %, 17.3 at. %, 17.4 at. %, 17.5 at. %, 17.6 at. %, 17.7 at. %, 17.8 at. %, 17.9 at. %, 18 at. %, 18.1 at. %, 18.2 at. %, 18.3 at. %, 18.4 at. %, 18.5 at. %, 18.6 at. %, 18.7 at. %, 18.8 at. %, 18.9 at. %, and/or 19 at. %.

In addition, due to, for example, the purity of the feedstocks and introduction of impurities during processing, the alloys may include up to 10 atomic percent of impurities. Therefore, the above described iron based alloy composition may be present in the range of 90 to 100 atomic percent of a given composition, including all values and increments therein, such as in the range of 90 to 99 atomic percent, etc.

While not intended to be limiting, an analysis of the mechanisms of deformation appear to show that that the operating mechanisms for ISBB and SBAI are orders of magnitude smaller than the system size. The operable system size may be understood as the volume of material containing the SGMM structure, which again may be in the range of 5% to 95% by volume. Additionally, for a liquid melt cooling on a chill surface such as a wheel or roller (which can be as wide as engineering will allow) 2-dimensional cooling may be a predominant factor in spinodal glass matrix microconstituent formation, thus the thickness may be a limiting factor on structure formation and resulting operable system size. At thicknesses above a reasonable system size compared to the mechanism size, the ductility mechanism may be unaffected. For example, the shear band widths may be relatively small (10 to 100 nm) and even with the LDIC interactions with the structure the interaction size may be from 20 to 200 nm. Thus, for example, achievement of relatively significant ductility (≥1%) at a 100 micron thickness means that the system thickness is already 500 to 10,000 times greater than ductility mechanism sizes.

It is contemplated that the operable system size, which when exceeded would allow for ISBB and SBAI interactions, may be in the range of ~10 nm to 1 micron in thickness or 1000 $nm^3$ to 1 $\mu m^3$ in volume. Achieving thicknesses greater ~1 micron or operable volumes greater 1 $\mu m^3$ may not be expected to significantly affect the operable mechanisms or achievement of significant levels of plasticity since the operable ductility mechanistic size is below this limit. Thus, greater thickness or greater volume samples or products would be contemplated to achieve an operable ductility with ISBB and SBAI mechanisms in a similar fashion as identified as long as the SGMM structure is formed.

Processing may be performed using techniques that may result in cooling rates sufficient to provide the SGMM structures. Such cooling rates may be in the range of $10^3$ to $10^6$ K/s. Examples of processing techniques that may be configured to provide the SGMM structures herein and associated plasticity may include, but are not limited to, melt-spinning/jet casting, hyperquenching, Taylor-Ulitovsky wire casting, planar flow casting, and twin roll casting. Additional details of these manufacturing techniques, operating in a manner to provide the structures and resulting properties presented in this application herein, are included below.

Melt spinning may be understood to include a liquid melt ejected using gas pressure onto a rapidly moving metallic wheel which may be made of copper. Continuous or broken up lengths of ribbon may be produced. In some embodiments, the ribbon may be in the range of 1 mm to 2 mm wide and 0.015 to 0.15 mm thick, including all values and increments therein. The width and thickness may depend on the melt spun materials viscosity and surface tension and the wheel tangential velocity. Typical cooling rates in the melt-spinning process may be from ~$10^4$ to ~$10^6$ K/s, including all values and increments therein. Ribbons may generally be produced in a continuous fashion up to 25 m long using a laboratory scale system.

Jet casters may be used to melt-spin alloys on a commercial scale. Process parameters in one embodiment of melt spinning may include providing the liquid melt in a chamber, which is in an environment including air or an inert gas, such as helium, carbon dioxide, carbon dioxide and carbon monoxide mixtures, or carbon dioxide and argon mixtures. The chamber pressure may be in the range of 0.25 atm to 1 atm, including all values and increments therein. Further, the casting wheel tangential velocity may be in the range of 15 meters per second (m/s) to 30 m/s, including all values and increments therein. Resulting ejection pressures may be in the range of 100 to 300 mbar and resulting ejection temperatures may be in the range of 1000° C. to 1300° C., including all values and increments therein.

Hyperquenching may be understood as a relatively large scale commercial process that may be based on relatively continuous rapid solidification molten metal and used for fiber production. In this process, molten metal may be consistently poured onto a moving surface of a rotating chill roll with a specifically designed groove pattern. Fibers may be solidified on the chill roll at lengths that may vary from a 0.015 mm to a 100 mm in width, including all values and increments therein and thickness from 0.015 to 0.15 mm, including all values and increments therein. Typical cooling rates in the melt-spinning process may be from ~$10^4$ to ~$10^6$ K/s, including all values and increments therein.

An example of a process for producing relatively small diameter wire with a circular cross section is the Taylor-Ulitovsky process. Metal feedstock in the form of a powder, ingot, ribbon, or wire may be held in a glass tube, typically a borosilicate composition, which is closed at one end. This end of the tube may then be heated in order to soften the glass to a temperature at which the metal part is in liquid state while the glass may be softened yet not melted. The glass containing the liquid melt may then be drawn down to produce a fine glass capillary containing a metal core. At suitable drawing conditions, the molten metal fills the glass capillary and a microwire may be produced where the metal core is completely coated by a glass shell. The process may be continuous by continuously feeding the metal drop using powder or wire/ribbon with new alloy material. This method is generally understood to be a relatively low cost method. The amount of glass used in the process may be balanced by the continuous feeding of the glass tube through the inductor zone, whereas the formation of the metallic core may be restricted by the initial quantity of the master alloy droplet. The microstructure of a microwire (and hence, its properties) may depend mainly on the cooling rate, which can be controlled by a cooling mechanism when the metal-filled capillary enters into a stream of cooling liquid (water or oil) on its way to the receiving coil. Metal cores in the range of 1 μm to 120 μm with a glass coating which may be in the range of 2 μm to 20 μm in thickness, including all values and increments therein, may be produced by this method. Cooling rates may vary from $10^3$ to $10^6$ K/s, including all values and increments therein, in the process.

Planar flow casting may be understood as a relatively low cost and relatively high volume technique to produce wide ribbon in the form of continuous sheet. The process may include flowing a liquid melt at a close distance over a chill surface. Widths of thin foil/sheet up to 18.4" (215 mm), including all values and increments in the range of 10 mm to 215 mm, may be produced on a commercial scale with thickness in the range of 0.016 to 0.075 mm, including all values and increments therein. Cooling rates in the range of $\sim 10^4$ to $\sim 10^6$ K/s, including all values and increments therein may be provided. After production of sheets, the individual sheets (from 5 to 50) may be warm pressed to roll bond the compacts into sheets.

Twin roll casting may be understood to include quenching a liquid melt between two rollers rotating in opposite directions. Solidification may begin at first contact between the upper part of each of the rolls and the liquid melt. Two individual shells may begin to form on each chill surface and, as the process continues, may be subsequently brought together at the roll nip by the chill rolls to form one continuous sheet. In this approach, solidification may occur rapidly and direct melt thicknesses may be achieved much thinner than conventional melt processes and typically into the 1.5 mm to 3.0 mm range prior to any post processing steps such as hot rolling. The process may similar in many ways to planar flow casting, yet a main differences is that two chill rollers may used to produce sheet in twin roll casting rather than a single chill roller in planar flow casting. However, in the context of the sheet that may be produced herein, having the indicated SGMM structure, the thickness may be in the range of 0.5 mm to 5.0 mm.

Accordingly, as may be appreciated from the above, the iron based alloys may be formed into fiber, wire, ribbon, sheet and/or foil. In the form of wire or fiber, the alloys may have a diameter in the range of 1 μm to 120 μm, including all values and ranges therein. In the form of ribbon, sheet or foil, the alloys may have a diameter in the range of 0.015 mm to 215 mm, including all values and ranges therein.

The solidified iron based alloys may have a density in the range of 7.40 g/cm$^3$ to 7.80 g/cm$^3$, including all values and increments therein. In addition, the iron based alloys may exhibit a glass to crystalline transformation temperature in the range of approximately 396° C. to 713° C., including all values and ranges therein, when measured by differential thermal analysis (DTA) or differential scanning calorimetry (DSC) at a heating rate of 10° C./minute. The enthalpy of transformation may be in the range of −16 J/gram to −167 J/gram, including all values and increments therein, when measured by differential thermal analysis (DTA) or differential scanning calorimetry (DSC) at a heating rate of 10° C./minute.

The iron based alloys may exhibit 180 degree bending, where ribbons having a thickness in the range of 0.020 mm to 0.060 mm may be bent over completely flat. The iron based alloys may also exhibit an ultimate tensile strength in the range of 0.4 GPa to 3.90 GPa, including all values and ranges therein, such as 1.00 GPa to 3.26 GPa, when tested at a strain rate of 0.001 s$^{-1}$. In addition, the iron based alloys may exhibit a total elongation in the range of 0.4% to 5.5%, including all values and ranges therein, such as 1.0% to 5.5%, when tested at a strain rate of 0.001 s$^{-1}$. The alloys may exhibit a Vickers hardness in the range of 900 to 950, including all values and ranges therein, when tested with a diamond pyramid indenter using a 50 g load. The alloys may also exhibit a shear band density of at least 90×10$^3$/meter to 300×10$^3$/meter, including all values and ranges therein. The presence of the ductility and the relatively high shear band density indicate that SGMM structures have formed in the alloys.

EXAMPLES

The following examples are for the purpose of illustration and are not meant to limit the disclosure or claims appended hereto.

Example 1

The chemical composition of the alloys studies are shown in Table 1 which provides the specific atomic ratios utilized. These chemistries have been used for material processing by melt-spinning with both commercial purity and high purity feedstocks. Using high purity elements, 15 g alloy feedstocks of the targeted alloys were weighed out according to the atomic ratios provided in Table 1. The feedstock material was then placed into the copper hearth of an arc-melting system. The feedstock was arc-melted into an ingot using high purity argon as a shielding gas. The ingots were flipped several times and re-melted to ensure homogeneity. After mixing, the ingots were then cast in the form of a finger approximately 12 mm wide by 30 mm long and 8 mm thick. The resulting fingers were then placed in a melt-spinning chamber in a quartz crucible with a hole diameter of ~0.81 mm. The ingots were melted in a different atmospheres and process conditions as identified by PP1 through PP6 process conditions in Table 3 using RF induction and then ejected onto a 245 mm diameter copper wheel which was traveling at different tangential velocities. The resulting ribbons that were produced had widths which were typically ~1.25 mm and thickness from 0.020 to 0.060 mm. For commercial processing studies, the alloys listed in Table 1 were made up in commercial purity (up to 10 at % impurity) using various ferroadditive and other readily commercially available constituents chosen in an effort to minimize alloy cost.

TABLE 1

| Chemical Composition of the Alloys | | | | | |
|---|---|---|---|---|---|
| Alloy | Fe | Ni | B | Si | Cr |
| A-Series | | | | | |
| A0 | 60.35 | 15.31 | 13.91 | 0.43 | 0.00 |
| A1 | 59.72 | 15.16 | 13.77 | 0.42 | 0.93 |
| A2 | 58.47 | 14.84 | 13.49 | 0.41 | 2.78 |
| A3 | 57.23 | 14.52 | 13.20 | 0.41 | 4.64 |
| A4 | 56.00 | 14.20 | 12.92 | 0.41 | 6.48 |
| A5 | 54.14 | 13.73 | 12.48 | 0.39 | 9.25 |
| A6 | 52.28 | 13.27 | 12.06 | 0.38 | 12.02 |
| A7 | 51.05 | 12.96 | 11.77 | 0.37 | 13.85 |

TABLE 1-continued

Chemical Composition of the Alloys

| Alloy | Fe | Ni | B | Si | Cr |
|---|---|---|---|---|---|
| A8  | 49.82 | 12.65 | 11.49 | 0.36 | 15.69 |
| A9  | 47.97 | 12.17 | 11.07 | 0.35 | 18.44 |
| A10 | 59.16 | 15.75 | 14.63 | 0.46 | 0.00 |
| A11 | 47.03 | 15.53 | 14.38 | 0.46 | 12.60 |
| A12 | 46.91 | 15.53 | 12.71 | 3.38 | 11.47 |
| B-Series | | | | | |
| B1  | 65.88 | 9.00 | 13.77 | 0.42 | 0.93 |
| B2  | 64.31 | 9.00 | 13.49 | 0.41 | 2.78 |
| B3  | 62.75 | 9.00 | 13.20 | 0.41 | 4.64 |
| B4  | 61.20 | 9.00 | 12.92 | 0.41 | 6.48 |
| B5  | 58.88 | 9.00 | 12.48 | 0.39 | 9.25 |
| B6  | 56.55 | 9.00 | 12.06 | 0.38 | 12.02 |
| B7  | 55.01 | 9.00 | 11.77 | 0.37 | 13.85 |
| B8  | 53.46 | 9.00 | 11.49 | 0.36 | 15.69 |
| B9  | 51.14 | 9.00 | 11.07 | 0.35 | 18.44 |
| B10 | 66.78 | 8.10 | 14.18 | 0.44 | 0.50 |
| B11 | 52.67 | 8.10 | 14.72 | 0.56 | 13.95 |
| B12 | 54.98 | 8.10 | 11.93 | 3.69 | 11.30 |
| C-Series | | | | | |
| C1  | 68.13 | 6.75 | 13.77 | 0.42 | 0.93 |
| C2  | 66.56 | 6.75 | 13.49 | 0.41 | 2.78 |
| C3  | 65.00 | 6.75 | 13.20 | 0.41 | 4.64 |
| C4  | 63.45 | 6.75 | 12.92 | 0.41 | 6.48 |
| C5  | 61.13 | 6.75 | 12.48 | 0.39 | 9.25 |
| C6  | 58.80 | 6.75 | 12.06 | 0.38 | 12.02 |
| C7  | 57.26 | 6.75 | 11.77 | 0.37 | 13.85 |
| C8  | 55.71 | 6.75 | 11.49 | 0.36 | 15.69 |
| C9  | 53.39 | 6.75 | 11.07 | 0.35 | 18.44 |
| C10 | 68.64 | 6.08 | 14.20 | 0.36 | 0.72 |
| C11 | 56.38 | 6.08 | 14.60 | 0.61 | 12.33 |
| C12 | 58.29 | 6.08 | 11.72 | 2.93 | 10.98 |
| D-Series | | | | | |
| D1  | 70.38 | 4.50 | 13.77 | 0.42 | 0.93 |
| D2  | 68.81 | 4.50 | 13.49 | 0.41 | 2.78 |
| D3  | 67.25 | 4.50 | 13.20 | 0.41 | 4.64 |
| D4  | 65.70 | 4.50 | 12.92 | 0.41 | 6.48 |
| D5  | 63.38 | 4.50 | 12.48 | 0.39 | 9.25 |
| D6  | 61.05 | 4.50 | 12.06 | 0.38 | 12.02 |
| D7  | 59.51 | 4.50 | 11.77 | 0.37 | 13.85 |
| D8  | 57.96 | 4.50 | 11.49 | 0.36 | 15.69 |
| D9  | 55.64 | 4.50 | 11.07 | 0.35 | 18.44 |
| D10 | 69.72 | 4.05 | 14.56 | 0.50 | 1.17 |
| D11 | 57.83 | 4.05 | 14.37 | 0.34 | 13.41 |
| D12 | 59.29 | 4.05 | 11.30 | 3.84 | 11.52 |

The density of the alloys in ingot form was measured using the Archimedes method in a specially constructed balance allowing weighing in both air and distilled water. The density of the arc-melted 15 gram ingots for each alloy is tabulated in Table 2 and was found to vary from 7.52 g/cm$^3$ to 7.80 g/cm$^3$. Experimental results have revealed that the accuracy of this technique is +−0.01 g/cm$^3$. A summary on density measurement are presented in Table 2.

TABLE 2

Summary of Density Results (g/cm$^3$)

| A-Series | | B-Series | | C-Series | | D-Series | |
|---|---|---|---|---|---|---|---|
| A0 | 7.80 | | | | | | |
| A1 | 7.79 | B1 | 7.67 | C1 | 7.66 | D1 | 7.56 |
| A2 | 7.76 | B2 | 7.63 | C2 | 7.63 | D2 | 7.60 |
| A3 | 7.76 | B3 | 7.56 | C3 | 7.62 | D3 | 7.53 |
| A4 | 7.74 | B4 | 7.60 | C4 | 7.61 | D4 | 7.68 |
| A5 | 7.74 | B5 | 7.59 | C5 | 7.57 | D5 | 7.57 |
| A6 | 7.71 | B6 | 7.66 | C6 | 7.54 | D6 | 7.58 |
| A7 | 7.68 | B7 | 7.69 | C7 | 7.57 | D7 | 7.54 |
| A8 | 7.68 | B8 | 7.69 | C8 | 7.53 | D8 | 7.52 |
| A9 | 7.67 | B9 | 7.69 | C9 | 7.65 | D9 | 7.52 |
| A10 | 7.72 | B10 | 7.63 | C10 | 7.63 | D10 | 7.58 |
| A11 | 7.63 | B11 | 7.57 | C11 | 7.48 | D11 | 7.51 |
| A12 | 7.57 | B12 | 7.47 | C12 | 7.48 | D12 | 7.44 |

The process parameters used to process the samples are shown in Table 3. As indicated, two different wheel tangential velocities 25 m/s and 16 m/s were used. The variation in wheel tangential velocity may be a relatively important factor controlling ribbon thickness, which may affect the cooling rate of the material. The processing atmosphere was varied to include processing in helium, air, and carbon dioxide. All samples were processed at ⅓ atm chamber pressure. With respect to charge purity, both high purity (HP) and commercial purity (CP) charges were used. Note that high purity charges were made by alloying directly from elements while commercial purity charges were made from utilizing ferroadditive powders and other constituents at a chemistry level which is commonly utilized in welding grade materials.

TABLE 3

Summary of Key Processing Variations

| | Processing Parameter | | | | | |
|---|---|---|---|---|---|---|
| | PP1 | PP2 | PP3 | PP4 | PP5 | PP6 |
| Wheel Speed (m/s) | 25 | 25 | 16 | 16 | 16 | 16 |
| Atmosphere | He | Air | He | CO$_2$ | Air | CO$_2$ |
| Charge purity | HP | CP | HP | HP | HP | CP |

To illustrate the effects of chemistry changes on the structure, properties, and process window, all of the alloys in Table 1 were processed according to the PP4 processing parameter as specified in Table 3. From the ribbons that were produced, various experimental measurements were made including thermal analysis, corrugation bend testing, and tensile testing. The results of the Table 1 alloys processed by the PP4 processing conditions are described in the following sections.

Thermal analysis was performed on the as-solidified ribbons using a system with the DSC-7 option. Differential thermal analysis (DTA) and differential scanning calorimetry (DSC) was performed at a heating rate of 10° C./minute with samples protected from oxidation through the use of flowing ultrahigh purity argon. In Table 4, the DSC data related to the glass to crystalline transformation is shown for the alloys that have been melt-spun using the PP4 melt-spinning process parameters. All of the samples were found to contain a relatively significant fraction of glass (i.e. ≥10%). As seen, the glass to crystalline transformation may occur in one or two stages in the range of temperature from 400° C. to 713° C. and with enthalpies of transformation from 22 J/g to 165 J/g.

TABLE 4

DTA Data for Alloys Processed Using PP4 Parameter

| Alloy | Glass Present | Peak #1 Onset [° C.] | Peak #1 Temp [° C.] | Peak #1 −ΔH [J/g] | Peak #2 Onset [° C.] | Peak #2 Temp [° C.] | Peak #2 −ΔH [J/g] | Peak #3 Onset [° C.] | Peak #3 Temp [° C.] | Peak #3 −ΔH [J/g] |
|---|---|---|---|---|---|---|---|---|---|---|
| A-Series | | | | | | | | | | |
| A0 | Y | 404 | 419 | 42 | 447 | 459 | 73 | | | |
| A1 | Y | 403 | 419 | 40 | 443 | 459 | 67 | | | |
| A2 | Y | 403 | 421 | 46 | 446 | 462 | 71 | | | |
| A3 | Y | 407 | 422 | 43 | 445 | 463 | 72 | | | |
| A4 | Y | 408 | 426 | 42 | 451 | 471 | 81 | | | |
| A5 | Y | 413 | 432 | 56 | 476 | 507 | 69 | | | |
| A6 | Y | 410 | 426 | 46 | 514 | 527 | 61 | | | |
| A7 | Y | 411 | 429 | 28 | 477 | 533 | 90 | | | |
| A8 | Y | 410 | 437 | 50 | 496 | 541 | 70 | | | |
| A9 | Y | 415 | 438 | 36 | 529 | 543 | 53 | | | |
| A10 | Y | 420 | 430 | 32 | 441 | 453 | 80 | 591 | 639 | 15 |
| A11 | Y | 427 | 445 | 19 | 513 | 529 | 87 | | | |
| A12 | Y | 452 | 463 | 51 | 497 | 522 | 91 | | | |
| B-Series | | | | | | | | | | |
| B1 | Y | 405 | 420 | 45 | 440 | 454 | 67 | | | |
| B2 | Y | 408 | 425 | 44 | 445 | 461 | 87 | | | |
| B3 | Y | 413 | 430 | 43 | 443 | 466 | 94 | | | |
| B4 | Y | 414 | 432 | 48 | 451 | 469 | 83 | | | |
| B5 | Y | 425 | 440 | 44 | 461 | 479 | 44 | | | |
| B6 | Y | 422 | 443 | 56 | 478 | 506 | 62 | | | |
| B7 | Y | 424 | 451 | 67 | 493 | 528 | 73 | | | |
| B8 | Y | 431 | 448 | 58 | 524 | 534 | 57 | | | |
| B9 | Y | 441 | 480 | 48 | 529 | 538 | 64 | | | |
| B10 | Y | 415 | 428 | 49 | 440 | 452 | 100 | | | |
| B11 | Y | 478 | 483 | 112 | | | | 667 | 689 | 24 |
| B12 | Y | 474 | 485 | 42 | 507 | 527 | 96 | 600 | 622 | 6 |
| C-Series | | | | | | | | | | |
| C1 | Y | 401 | 416 | 50 | 438 | 451 | 72 | | | |
| C2 | Y | 407 | 422 | 47 | 442 | 457 | 70 | | | |
| C3 | Y | 416 | 427 | 41 | 448 | 464 | 80 | | | |
| C4 | Y | 418 | 430 | 41 | 451 | 466 | 63 | | | |
| C5 | Y | 428 | 440 | 22 | 449 | 457 | 22 | | | |
| C6 | Y | 435 | 449 | 28 | 462 | 484 | 104 | | | |
| C7 | Y | 435 | | | | 500 | 113 | | | |
| C8 | Y | 436 | 458 | 47 | 489 | 553 | 81 | | | |
| C9 | Y | 439 | — | — | — | 530 | 113 | | | |
| C10 | Y | 414 | 427 | 40 | 436 | 446 | 90 | | | |
| C11 | Y | 481 | 484 | 112 | | | | 688 | 713 | 13 |
| C12 | Y | 464 | 504 | 51 | 509 | 529 | 84 | 617 | 631 | 10 |
| D-Series | | | | | | | | | | |
| D1 | Y | 408 | 423 | 44 | 440 | 456 | 91 | | | |
| D2 | Y | 414 | 428 | 35 | 437 | 459 | 92 | | | |
| D3 | Y | 416 | 429 | 37 | 447 | 461 | 65 | | | |
| D4 | Y | 417 | 439 | 33 | 449 | 469 | 69 | | | |
| D5 | Y | 437 | 448 | 41 | 462 | 479 | 106 | | | |
| D6 | Y | 436 | 450 | 37 | 470 | 483 | 90 | | | |
| D7 | Y | 442 | 452 | 15 | 472 | 491 | 90 | | | |
| D8 | Y | 440 | 460 | 20 | 477 | 502 | 104 | | | |
| D9 | Y | 487 | 494 | 8 | 501 | 511 | 63 | | | |
| D10 | Y | 444 | 449 | 133 | | | | 610 | 658 | 23 |
| D11 | Y | 477 | 484 | 122 | | | | 673 | 700 | 15 |
| D12 | Y | 480 | 489 | 18 | 504 | 534 | 114 | 605 | 634 | 33 |

The ability of the ribbons to bend completely flat may indicate a ductile condition whereby relatively high strain can be obtained but not measured by traditional bend testing. When the ribbons are folded completely around or back on themselves, they may experience relatively high strain which may be as high as 119.8% as derived from complex mechanics. In practice, the strain may be in the range of 57% to 97% strain in the tension side of the ribbon. During 180° bending (flat), four types of behavior were observed: Type 1 Behavior—not bendable without breaking, Type 2 Behavior—bendable on one side with wheel side out; Type 3 Behavior—bendable on one side with free side out; and Type 4 Behavior—bendable on both sides. Reference to "wheel side" may be understood as the side of the ribbon which contacted the wheel during melt spinning.

To measure bend ductility, produced ribbon from each alloy in Table 1 and processed at PP4 conditions (Table 3) were corrugated using a home built corrugation system which is designed to mimic the $1^{st}$ step in the corrugation process used to produce honeycomb. As the ribbon passes through the corrugated rollers, the ribbon is bent in opposite nearly 180° directions and then is permanently plastically deformed if ductile or broken into small pieces if brittle. FIGS. 1a through 1d include optical pictures of corrugated ribbon for corrugated ribbon of Alloy A2 (FIG. 1a), corrugated ribbon of Alloy B4 (FIG. 1b), corrugated ribbon of Alloy C6 (FIG. 1c) and corrugated ribbon of Alloy D8 (FIG. 1d). For each sample, a meter length of uniform ribbon was selected and then this was corrugated and the total number of breaks is listed in Table 5. Note that the corrugation was only done on ribbon that experienced Type 4 bending behavior, which means that the ribbon was bendable at 180° from both sides (i.e. wheel side and free side). Note that if Type 4 bending behavior was not experienced by hand bending then corrugation was not attempted since a relatively large number of breaks would occur generally in excess of 100 over a 1 meter length.

TABLE 5

Corrugation Test Results for PP4 Processed Alloys
(Number of Breaks per 1 meter)

| A-Series | | B-Series | | C-Series | | D-Series | |
|---|---|---|---|---|---|---|---|
| A0 | 0 | | | | | | |
| A1 | 2 | B1 | 0 | C1 | 0 | D1 | 0 |
| A2 | 0 | B2 | 0 | C2 | 0 | D2 | 0 |
| A3 | 0 | B3 | 2 | C3 | 0 | D3 | 0 |
| A4 | 0 | B4 | 0 | C4 | 0 | D4 | 0 |
| A5 | 0 | B5 | 0 | C5 | 0 | D5 | 0 |
| A6 | 0 | B6 | 0 | C6 | 0 | D6 | 0 |
| A7 | 0 | B7 | 1 | C7 | 0 | D7 | 1 |
| A8 | 0 | B8 | 0 | C8 | 1 | D8 | 12 |
| A9 | 0 | B9 | 0 | C9 | 0 | D9 | >100 |
| A10 | 46 | B10 | 0 | C10 | 4 | D10 | 2 |
| A11 | 2 | B11 | >100 | C11 | >100 | D11 | 80 |
| A12 | >100 | B12 | 1 | C12 | 70 | D12 | >100 |

The mechanical properties of metallic ribbons were obtained at room temperature using microscale tensile testing. The testing was carried out in a commercial tensile stage made by Fullam which was monitored and controlled by a MTEST Windows software program. The deformation was applied by a stepping motor through the gripping system while the load was measured by a load cell that was connected to the end of one gripping jaw. Displacement was obtained using a Linear Variable Differential Transformer (LVDT) which was attached to the two gripping jaws to measure the change of gage length. Before testing, the thickness and width of a ribbon were carefully measured for at least three times at different locations in the gage length. The average values were then recorded as gage thickness and width, and used as input parameters for subsequent stress and strain calculation. While raw mechanical test data assumes a rectangular cross section, in fact, the ribbon cross-section is curved on top as seen in the ribbon cross-section of FIG. 2 and the measured rectangular cross-section overestimates the true cross-section. The correction factor for geometrical effect was applied which was estimated to be 5% increase in measured strength characteristics (yield stress and ultimate strength). All tests were performed under displacement control, with a strain rate of ~0.001 s$^{-1}$. In Table 6, a summary of the tensile test results including gage dimensions, elongation, breaking load, yield stress, ultimate strength and Young's Modulus are shown for each alloy of Table 1. Note that each distinct sample was measured in triplicate to account for the variability of this test method and sample quality, including the presence of macro-defects in the sample. As can be seen the tensile strength values are very high and vary from 1.08 to 3.26 GPa with the total elongation values from 1.28% to 4.94%. Note that the results shown in Table 6 have been adjusted for machine compliance.

TABLE 6

Tensile Properties For PP4 Processed Materials

| Alloy | Dimensions [mm] | | | Tensile Elong. [%] | Break Load [N] | Yield Stress [GPa] | Ultimate Strength [GPa] | Elastic Modulus [GPa] |
|---|---|---|---|---|---|---|---|---|
| | W | T | L | | | | | |
| A1 | 1.48 | 0.050 | 9.20 | 3.91 | 201 | 1.66 | 2.86 | 91 |
| | 1.45 | 0.055 | 9.20 | 4.17 | 213 | 1.27 | 2.80 | 84 |
| | 1.54 | 0.055 | 9.00 | 3.56 | 215 | 1.93 | 2.67 | 86 |
| A2 | 1.50 | 0.056 | 9.50 | 4.11 | 206 | 1.76 | 2.57 | 71 |
| | 1.52 | 0.055 | 9.60 | 3.86 | 212 | 1.92 | 2.68 | 93 |
| | 1.57 | 0.054 | 9.20 | 3.90 | 207 | 2.04 | 2.57 | 94 |
| | 1.56 | 0.054 | 9.00 | 4.19 | 209 | 1.34 | 2.60 | 83 |
| A3 | 1.56 | 0.056 | 9.00 | 4.33 | 214 | 1.40 | 2.57 | 73 |
| | 1.49 | 0.054 | 9.00 | 4.28 | 199 | 1.19 | 2.59 | 78 |
| | 1.53 | 0.052 | 9.10 | 3.56 | 191 | 2.00 | 2.52 | 79 |
| A4 | 1.58 | 0.054 | 9.00 | 4.05 | 204 | 1.42 | 2.51 | 79 |
| | 1.55 | 0.054 | 9.00 | 3.16 | 178 | 1.25 | 2.24 | 79 |
| | 1.54 | 0.052 | 9.60 | 3.83 | 197 | 1.62 | 2.59 | 81 |
| A5 | 1.46 | 0.053 | 9.00 | 4.26 | 187 | 1.60 | 2.54 | 68 |
| | 1.42 | 0.051 | 9.00 | 4.61 | 184 | 1.97 | 2.67 | 62 |
| | 1.45 | 0.052 | 9.20 | 3.76 | 195 | 1.89 | 2.70 | 82 |
| A6 | 1.42 | 0.054 | 9.00 | 3.32 | 166 | 1.41 | 2.28 | 82 |
| | 1.44 | 0.056 | 9.00 | 3.69 | 188 | 1.67 | 2.45 | 76 |
| | 1.42 | 0.054 | 9.00 | 3.82 | 187 | 2.08 | 2.56 | 72 |
| A7 | 1.47 | 0.053 | 9.00 | 3.88 | 191 | 1.79 | 2.57 | 76 |
| | 1.46 | 0.054 | 9.00 | 3.42 | 182 | 1.66 | 2.43 | 75 |
| | 1.54 | 0.053 | 9.40 | 3.60 | 173 | 1.68 | 2.23 | 66 |
| A8 | 1.46 | 0.054 | 9.00 | 3.11 | 170 | 1.53 | 2.27 | 77 |
| | 1.42 | 0.054 | 9.00 | 3.50 | 182 | 2.14 | 2.50 | 66 |
| | 1.44 | 0.051 | 9.10 | 3.93 | 187 | 1.89 | 2.68 | 75 |
| A9 | 1.46 | 0.052 | 9.00 | 3.20 | 170 | 1.54 | 2.35 | 71 |
| | 1.43 | 0.053 | 9.00 | 2.39 | 108 | 1.42 | 1.49 | 70 |
| | 1.48 | 0.050 | 9.40 | 2.74 | 185 | 1.94 | 2.61 | 91 |
| A10 | 1.43 | 0.058 | 9.00 | 4.06 | 227 | 1.53 | 2.74 | 90 |
| | 1.45 | 0.059 | 9.00 | 4.13 | 226 | 1.60 | 2.64 | 101 |
| | 1.45 | 0.059 | 9.00 | 3.83 | 220 | 1.36 | 2.57 | 97 |
| A11 | 1.65 | 0.056 | 9.00 | 3.74 | 252 | 1.57 | 2.73 | 96 |
| | 1.65 | 0.057 | 9.00 | 3.80 | 248 | 1.41 | 2.64 | 95 |
| | 1.71 | 0.056 | 9.00 | 3.39 | 228 | 1.47 | 2.38 | 91 |
| A12 | 1.23 | 0.054 | 9.00 | 2.56 | 145 | 1.75 | 2.19 | 102 |
| | 1.16 | 0.057 | 9.00 | 3.20 | 171 | 1.93 | 2.58 | 95 |
| | 1.06 | 0.057 | 9.00 | 3.04 | 156 | 2.10 | 2.58 | 96 |
| B1 | 1.56 | 0.058 | 9.00 | 4.19 | 234 | 1.64 | 2.72 | 85 |
| | 1.46 | 0.056 | 9.00 | 4.42 | 215 | 1.43 | 2.75 | 83 |
| | 1.49 | 0.057 | 9.00 | 4.31 | 222 | 1.56 | 2.74 | 78 |
| B2 | 1.44 | 0.056 | 9.00 | 3.96 | 198 | 1.79 | 2.57 | 73 |
| | 1.39 | 0.055 | 9.00 | 4.42 | 194 | 1.51 | 2.67 | 72 |
| | 1.33 | 0.056 | 9.00 | 4.94 | 196 | 1.51 | 2.76 | 69 |
| B3 | 1.22 | 0.047 | 9.00 | 3.78 | 171 | 2.18 | 3.14 | 94 |
| | 1.25 | 0.047 | 9.30 | 3.71 | 182 | 2.52 | 3.26 | 98 |
| | 1.28 | 0.050 | 9.00 | 3.60 | 177 | 1.93 | 2.91 | 94 |
| B4 | 1.26 | 0.055 | 9.00 | 3.63 | 185 | 1.88 | 2.79 | 89 |
| | 1.28 | 0.053 | 9.00 | 3.48 | 177 | 2.03 | 2.73 | 86 |
| | 1.29 | 0.050 | 9.00 | 3.71 | 179 | 1.95 | 2.91 | 94 |
| B5 | 1.59 | 0.051 | 9.00 | 3.08 | 203 | 2.37 | 2.63 | 91 |
| | 1.57 | 0.052 | 9.00 | 3.72 | 223 | 1.71 | 2.88 | 88 |
| | 1.54 | 0.053 | 9.00 | 3.32 | 188 | 1.91 | 2.43 | 80 |
| B6 | 1.60 | 0.052 | 9.00 | 3.37 | 211 | 1.96 | 2.67 | 88 |
| | 1.59 | 0.053 | 9.00 | 3.44 | 199 | 1.77 | 2.49 | 82 |
| | 1.62 | 0.053 | 9.00 | 3.49 | 223 | 1.91 | 2.73 | 91 |
| B7 | 1.51 | 0.055 | 9.00 | 3.30 | 219 | 2.13 | 2.77 | 93 |
| | 1.60 | 0.054 | 9.00 | 3.99 | 222 | 1.68 | 2.70 | 80 |
| | 1.56 | 0.056 | 9.00 | 3.24 | 215 | 2.12 | 2.59 | 86 |
| B8 | 1.61 | 0.055 | 9.00 | 3.84 | 200 | 1.46 | 2.37 | 74 |
| | 1.66 | 0.055 | 9.00 | 4.46 | 217 | 1.40 | 2.50 | 70 |
| | 1.61 | 0.055 | 9.00 | 3.93 | 196 | 1.32 | 2.33 | 71 |
| B9 | 1.62 | 0.056 | 9.00 | 3.73 | 215 | 1.82 | 2.49 | 69 |
| | 1.63 | 0.054 | 9.00 | 3.47 | 210 | 1.75 | 2.50 | 71 |
| | 1.63 | 0.055 | 9.00 | 2.90 | 195 | 1.69 | 2.28 | 75 |

TABLE 6-continued

Tensile Properties For PP4 Processed Materials

| Alloy | Dimensions [mm] W | T | L | Tensile Elong. [%] | Break Load [N] | Yield Stress [GPa] | Ultimate Strength [GPa] | Elastic Modulus [GPa] |
|---|---|---|---|---|---|---|---|---|
| B10 | 1.52 | 0.058 | 9.00 | 3.58 | 218 | 1.87 | 2.47 | 79 |
|  | 1.49 | 0.060 | 9.00 | 4.14 | 242 | 1.77 | 2.72 | 79 |
|  | 1.51 | 0.058 | 9.00 | 4.17 | 243 | 1.54 | 2.77 | 86 |
| B11 | Brittle behavior | | | | | | | |
| B12 | 1.48 | 0.060 | 9.00 | 3.54 | 237 | 1.88 | 2.67 | 90 |
|  | 1.53 | 0.059 | 9.00 | 3.40 | 215 | 1.96 | 2.38 | 78 |
|  | 1.50 | 0.058 | 9.00 | 3.60 | 229 | 2.03 | 2.63 | 86 |
| C1 | 1.48 | 0.057 | 9.00 | 3.89 | 218 | 1.68 | 2.72 | 82 |
|  | 1.39 | 0.058 | 9.00 | 3.88 | 214 | 1.80 | 2.78 | 85 |
|  | 1.50 | 0.055 | 9.00 | 3.96 | 218 | 1.77 | 2.78 | 82 |
| C2 | 1.50 | 0.054 | 9.00 | 4.40 | 224 | 1.73 | 2.90 | 79 |
|  | 1.49 | 0.054 | 9.00 | 4.02 | 221 | 1.98 | 2.89 | 82 |
|  | 1.50 | 0.054 | 9.00 | 3.86 | 226 | 2.04 | 2.93 | 86 |
|  | 1.49 | 0.057 | 9.00 | 4.96 | 231 | 1.68 | 2.86 | 69 |
|  | 1.44 | 0.057 | 9.00 | 4.56 | 213 | 1.50 | 2.72 | 75 |
|  | 1.51 | 0.057 | 9.00 | 4.38 | 228 | 1.42 | 2.78 | 77 |
| C3 | 1.18 | 0.054 | 9.00 | 3.26 | 164 | 2.04 | 2.69 | 93 |
|  | 1.22 | 0.050 | 9.00 | 3.46 | 167 | 2.02 | 2.88 | 96 |
|  | 1.19 | 0.054 | 9.30 | 4.32 | 175 | 2.00 | 2.86 | 76 |
| C4 | 1.57 | 0.056 | 9.00 | 3.64 | 209 | 1.74 | 2.50 | 79 |
|  | 1.57 | 0.055 | 9.00 | 4.09 | 221 | 1.63 | 2.68 | 78 |
|  | 1.53 | 0.054 | 9.00 | 3.43 | 198 | 1.68 | 2.51 | 87 |
| C5 | 1.44 | 0.057 | 9.00 | 3.44 | 211 | 1.89 | 2.69 | 83 |
|  | 1.47 | 0.054 | 9.00 | 3.59 | 209 | 2.15 | 2.76 | 84 |
|  | 1.48 | 0.055 | 9.00 | 3.93 | 202 | 1.79 | 2.59 | 75 |
| C6 | 1.55 | 0.053 | 9.00 | 4.06 | 229 | 1.89 | 2.93 | 87 |
|  | 1.56 | 0.055 | 9.00 | 4.16 | 232 | 1.81 | 2.85 | 83 |
|  | 1.61 | 0.057 | 9.00 | 4.53 | 237 | 1.65 | 2.71 | 71 |
| C7 | 1.59 | 0.053 | 9.00 | 2.87 | 197 | 2.17 | 2.46 | 90 |
|  | 1.54 | 0.052 | 9.00 | 3.03 | 208 | 2.16 | 2.73 | 98 |
|  | 1.64 | 0.052 | 9.00 | 2.59 | 188 | 1.91 | 2.31 | 98 |
| C8 | 1.49 | 0.057 | 9.00 | 3.34 | 215 | 2.00 | 2.67 | 88 |
|  | 1.58 | 0.058 | 9.00 | 1.56 | 124 | 1.28 | 1.42 | 92 |
|  | 1.55 | 0.056 | 9.00 | 1.28 | 90 | 0.99 | 1.08 | 89 |
| C9 | 1.69 | 0.052 | 9.00 | 2.40 | 179 | 1.73 | 2.15 | 100 |
|  | 1.79 | 0.056 | 9.00 | 2.78 | 212 | 2.04 | 2.22 | 84 |
|  | 1.84 | 0.055 | 9.00 | 2.77 | 202 | 1.84 | 2.10 | 81 |
| C10 | 1.42 | 0.060 | 9.00 | 3.41 | 213 | 1.38 | 2.50 | 95 |
|  | 1.40 | 0.062 | 9.00 | 3.82 | 223 | 1.97 | 2.57 | 79 |
|  | 1.41 | 0.061 | 9.00 | 4.20 | 247 | 2.10 | 2.87 | 80 |
| C11 | 1.56 | 0.059 | 9.00 | 3.30 | 225 | 2.00 | 2.44 | 84 |
|  | 1.51 | 0.058 | 9.00 | 3.52 | 237 | 2.51 | 2.71 | 83 |
|  | 1.56 | 0.058 | 9.00 | 3.61 | 234 | 1.83 | 2.59 | 84 |
| C12 | 1.51 | 0.062 | 9.00 | 3.79 | 229 | 1.38 | 2.45 | 86 |
|  | 1.51 | 0.062 | 9.00 | 4.19 | 252 | 1.61 | 2.69 | 83 |
|  | 1.49 | 0.062 | 9.00 | 4.01 | 240 | 1.96 | 2.60 | 74 |
| D1 | 1.46 | 0.056 | 9.00 | 3.86 | 205 | 1.63 | 2.64 | 82 |
|  | 1.41 | 0.058 | 9.00 | 3.60 | 198 | 1.86 | 2.55 | 79 |
|  | 1.43 | 0.058 | 9.00 | 3.78 | 207 | 1.64 | 2.63 | 82 |
| D2 | 1.36 | 0.057 | 9.00 | 4.43 | 205 | 1.72 | 2.78 | 87 |
|  | 1.38 | 0.057 | 9.00 | 4.12 | 213 | 2.40 | 2.85 | 86 |
|  | 1.36 | 0.057 | 9.00 | 4.37 | 216 | 1.58 | 2.93 | 84 |
|  | 1.43 | 0.057 | 9.00 | 3.39 | 170 | 1.80 | 2.19 | 71 |
|  | 1.39 | 0.058 | 9.00 | 4.32 | 216 | 1.40 | 2.80 | 80 |
|  | 1.46 | 0.057 | 9.00 | 3.89 | 216 | 1.69 | 2.73 | 77 |
| D3 | 1.57 | 0.057 | 9.00 | 4.19 | 204.1 | 1.54 | 2.51 | 71 |
| D3 | 1.54 | 0.058 | 9.20 | 4.49 | 222 | 1.66 | 2.74 | 70 |
|  | 1.57 | 0.057 | 9.00 | 4.19 | 204 | 1.47 | 2.39 | 71 |
|  | 1.54 | 0.058 | 9.20 | 4.49 | 222 | 1.58 | 2.61 | 70 |
|  | 1.54 | 0.057 | 9.00 | 0.33 | 231 | 1.61 | 2.76 | 69 |
|  | 1.55 | 0.059 | 9.00 | 3.74 | 219 | 1.64 | 2.51 | 78 |
|  | 1.52 | 0.060 | 9.00 | 3.73 | 211 | 1.49 | 2.43 | 79 |
|  | 1.50 | 0.058 | 9.00 | 3.92 | 220 | 1.66 | 2.66 | 80 |
| D4 | 1.50 | 0.054 | 9.00 | 3.81 | 217 | 1.61 | 2.81 | 85 |
|  | 1.48 | 0.057 | 9.00 | 4.48 | 230 | 1.66 | 2.86 | 79 |
|  | 1.46 | 0.052 | 9.00 | 4.34 | 225 | 1.70 | 3.11 | 90 |
| D5 | 1.51 | 0.056 | 9.00 | 3.83 | 211 | 1.72 | 2.64 | 79 |
|  | 1.45 | 0.055 | 9.00 | 3.99 | 217 | 1.72 | 2.85 | 87 |
|  | 1.49 | 0.057 | 9.00 | 3.86 | 213 | 1.62 | 2.65 | 82 |
| D6 | 1.36 | 0.056 | 9.00 | 4.06 | 205 | 1.88 | 2.82 | 79 |
|  | 1.41 | 0.056 | 9.00 | 3.38 | 183 | 1.53 | 2.43 | 90 |
|  | 1.40 | 0.057 | 9.00 | 3.64 | 194 | 1.71 | 2.55 | 88 |
| D7 | 1.50 | 0.058 | 9.00 | 3.66 | 230 | 2.03 | 2.77 | 87 |
|  | 1.56 | 0.058 | 9.00 | 3.59 | 207 | 1.62 | 2.42 | 83 |
|  | 1.49 | 0.059 | 9.00 | 3.36 | 189 | 1.37 | 2.26 | 85 |
| D8 | 1.56 | 0.056 | 9.00 | 3.13 | 174 | 1.52 | 2.10 | 83 |
| D8 | 1.51 | 0.055 | 9.00 | 3.56 | 194 | 1.48 | 2.45 | 89 |
|  | 1.47 | 0.056 | 9.00 | 3.23 | 168 | 1.76 | 2.14 | 80 |
| D9 | Brittle behavior | | | | | | | |
| D10 | 1.41 | 0.061 | 9.00 | 3.92 | 226 | 1.75 | 2.63 | 80 |
|  | 1.44 | 0.059 | 9.00 | 4.56 | 245 | 1.89 | 2.88 | 75 |
|  | 1.40 | 0.059 | 9.00 | 4.29 | 231 | 1.65 | 2.80 | 84 |
| D11 | 1.58 | 0.058 | 9.00 | 3.64 | 242 | 1.73 | 2.64 | 83 |
|  | 1.58 | 0.057 | 9.00 | 4.17 | 259 | 1.77 | 2.87 | 87 |
|  | 1.66 | 0.056 | 9.00 | 3.72 | 248 | 1.79 | 2.67 | 87 |
| D12 | Brittle behavior | | | | | | | |

Example 2

To illustrate the effects of processing parameters on the structure and properties, A-series alloys in Table 1 were processed at various conditions specified in Table 3. From the ribbons that were produced, various experimental measurements were performed including thermal analysis, corrugation bend testing, and tensile testing. The results of A-series alloys in Table 1 processed at different processing conditions are described in the following sections.

Thermal analysis was performed on the as-solidified ribbons using a NETZSCH DSC404 F3 Pegasus Differential Scanning calorimeter (DSC). Constant heating rate scans at a heating rate of 10° C./minute with samples protected from oxidation through the use of flowing ultrahigh purity argon. In Tables 7-12, the DSC data related to the glass to crystalline transformation is shown for the A-Series alloys that have been melt-spun at process conditions specified in Table 3. Most of the samples were found to contain a significant fraction of glass as evidenced by one or more characteristic exothermic peaks except some of the alloys processed at PP6 conditions. The glass to crystalline transformation occurs in one or two stages with overlapping peaks for some alloys in the range of temperature from 389° C. to 642° C. and with enthalpies of transformation from −16 J/g to −167 J/g.

TABLE 7

DSC Data for Alloys Processed at PP1 Parameters

| Alloy | Glass Present | Peak #1 Onset [° C.] | Peak #1 Temp [° C.] | Peak #1 −ΔH [J/g] | Peak #2 Onset [° C.] | Peak #2 Temp [° C.] | Peak #2 −ΔH [J/g] | Peak #3 Onset [° C.] | Peak #3 Temp [° C.] | Peak #3 −ΔH [J/g] |
|---|---|---|---|---|---|---|---|---|---|---|
| A0 | Y | 404.9 | 418.5 | 46.51 | 443.4 | 455.2 | 77.59 | — | — | — |
| A1 | Y | 408 | 421 | 46 | 460 | 465 | 87 | — | — | — |
| A2 | Y | 405 | 416 | 48 | 461 | 470 | 75 | — | — | — |
| A3 | Y | 408 | 419 | 46 | 455 | 469 | 65 | — | — | — |
| A4 | Y | 408 | 424 | 41 | 475 | 484 | 64 | — | — | — |
| A5 | Y | 412 | 430 | 50 | 491 | 503 | 70 | — | — | — |
| A6 | Y | 413 | 434 | 90 | 515 | 527 | 94 | — | — | — |
| A7 | Y | 415 | 436 | 74 | 521 | 534 | 75 | — | — | — |
| A8 | Y | 416 | 434 | — | — | 453 | 75* | — | — | — |
| A9 | Y | 425 | 452 | — | — | 471 | 84* | — | — | — |
| A10 | Y | 424 | 432 | 41 | 447 | 457 | 90 | 586 | 627 | 14 |
| A11 | Y | 431 | 448 | 17 | 518 | 530 | 89 | — | — | — |
| A12 | Y | 449 | 460 | 53 | 505 | 523 | 79 | — | — | — | at. %,

*Overlapping peaks

TABLE 8

DSC Data for Alloys Processed at PP2 Parameters

| Alloy | Glass Present | Peak #1 Onset [° C.] | Peak #1 Temp [° C.] | Peak #1 −ΔH [J/g] | Peak #2 Onset [° C.] | Peak #2 Temp [° C.] | Peak #2 −ΔH [J/g] | Peak #3 Onset [° C.] | Peak #3 Temp [° C.] | Peak #3 −ΔH [J/g] |
|---|---|---|---|---|---|---|---|---|---|---|
| A0 | Y | 402 | 413 | 42 | 445 | 459 | 78 | — | — | — |
| A1 | Y | 400 | 411 | 65 | 457 | 461 | 70 | — | — | — |
| A2 | Y | 401 | 413 | 44 | 466 | 472 | 59 | — | — | — |
| A3 | Y | 401 | 436 | 69 | 456 | 481 | 75 | — | — | — |
| A4 | Y | 401 | 436 | 57 | 456 | 481 | 62 | — | — | — |
| A5 | Y | 401 | 436 | 63 | 456 | 481 | 69 | — | — | — |
| A6 | Y | 401 | 436 | 15 | 456 | 481 | 17 | — | — | — |
| A7 | Y | 401 | 436 | 69 | 456 | 481 | 75 | — | — | — |
| A8 | Y | 401 | 436 | 69 | 456 | 481 | 75 | — | — | — |
| A9 | Y | 401 | 436 | 69 | 456 | 481 | 75 | — | — | — |
| A10 | Y | 411 | 420 | 35 | 439 | 452 | 106.6- | — | — | — |
| A11 | Y | 426 | 443 | 16 | 519 | 533 | 76 | — | — | — |
| A12 | Y | 446 | 458 | 35 | 519 | 526 | 57 | — | — | — |

TABLE 9

DSC Data for Alloys Processed at PP3 Parameters

| Alloy | Glass Present | Peak #1 Onset [° C.] | Peak #1 Temp [° C.] | Peak #1 −ΔH [J/g] | Peak #2 Onset [° C.] | Peak #2 Temp [° C.] | Peak #2 −ΔH [J/g] | Peak #3 Onset [° C.] | Peak #3 Temp [° C.] | Peak #3 −ΔH [J/g] |
|---|---|---|---|---|---|---|---|---|---|---|
| A0 | Y | 406 | 421 | 41 | 442 | 456 | 82 | — | — | — |
| A1 | Y | 406 | 419 | 36 | 448 | 457 | 68 | — | — | — |
| A2 | Y | 401 | 415 | 47 | 439 | 455 | 73 | — | — | — |
| A3 | Y | 408 | 420 | 35 | 453 | 465 | 74 | — | — | — |
| A4 | Y | 407 | 420 | 39 | 455 | 466 | 66 | — | — | — |
| A5 | Y | 412 | 428 | 65 | 481 | 501 | 101 | — | — | — |
| A6 | Y | 411 | 440 | 75 | 515 | 528 | 91 | — | — | — |
| A7 | Y | 410 | 434 | 76 | 517 | 529 | 85 | — | — | — |
| A8 | Y | 408 | 447 | 45 | 525 | 537 | 41 | — | — | — |
| A9 | Y | — | — | — | 519 | 537 | 34 | — | — | — |
| A10 | Y | 414 | 425 | 42 | 444 | 455 | 82 | 587 | 637 | 13 |
| A11 | Y | 425 | 442 | 24 | 479 | 520 | 97 | 609 | 633 | 11 |
| A12 | Y | 449 | 460 | 51 | 502 | 522 | 80 | — | — | — |

TABLE 10

DSC Data for Alloys Processed at PP4 Parameters

| Alloy | Glass Present | Peak #1 Onset [° C.] | Peak #1 Temp [° C.] | Peak #1 −ΔH [J/g] | Peak #2 Onset [° C.] | Peak #2 Temp [° C.] | Peak #2 −ΔH [J/g] | Peak #3 Onset [° C.] | Peak #3 Temp [° C.] | Peak #3 −ΔH [J/g] |
|---|---|---|---|---|---|---|---|---|---|---|
| A0 | Y | 404 | 419 | 42 | 447 | 459 | 73 | — | — | — |
| A1 | Y | 403 | 419 | 40 | 443 | 459 | 67 | — | — | — |
| A2 | Y | 403 | 421 | 46 | 446 | 462 | 71 | — | — | — |
| A3 | Y | 407 | 422 | 43 | 445 | 463 | 72 | — | — | — |
| A4 | Y | 408 | 426 | 42 | 451 | 471 | 81 | — | — | — |
| A5 | Y | 413 | 432 | 56 | 476 | 507 | 69 | — | — | — |
| A6 | Y | 410 | 426 | 46 | 514 | 527 | 61 | — | — | — |
| A7 | Y | 411 | 429 | 28 | 477 | 533 | 90 | — | — | — |
| A8 | Y | 410 | 437 | 50 | 496 | 541 | 70 | — | — | — |
| A9 | Y | 415 | 438 | 37 | 529 | 543 | 53 | — | — | — |
| A10 | Y | 420 | 430 | 32 | 441 | 453 | 80 | 591 | 639 | 15 |
| A11 | Y | 427 | 445 | 19 | 513 | 529 | 87 | — | — | — |
| A12 | Y | 452 | 463 | 51 | 497 | 522 | 91 | — | — | — |

TABLE 11

DSC Data for Alloys Processed at PP5 Parameters

| Alloy | Glass Present | Peak #1 Onset [° C.] | Peak #1 Temp [° C.] | Peak #1 −ΔH [J/g] | Peak #2 Onset [° C.] | Peak #2 Temp [° C.] | Peak #2 −ΔH [J/g] | Peak #3 Onset [° C.] | Peak #3 Temp [° C.] | Peak #3 −ΔH [J/g] |
|---|---|---|---|---|---|---|---|---|---|---|
| A0 | Y | 396 | 414 | 41 | 441 | 454 | 68 | — | — | — |
| A1 | Y | 398 | 413 | 43 | 450 | 458 | 63 | — | — | — |
| A2 | Y | 409 | 415 | 45 | 449 | 460 | 70 | — | — | — |
| A3 | Y | 403 | 417 | 40 | 453 | 465 | 66 | — | — | — |
| A4 | Y | 411 | 423 | 35 | 457 | 470 | 66 | — | — | — |
| A5 | Y | 414 | 427 | 35 | 488 | 504 | 59 | — | — | — |
| A6 | Y | 412 | 433 | 56 | 515 | 529 | 66 | — | — | — |
| A7 | Y | 412 | 429 | 41 | 512 | 527 | 60 | — | — | — |
| A8 | Y | — | — | — | 512 | 527 | 33 | — | — | — |
| A9 | Y | 465 | 483 | — | — | 527 | 82* | — | — | — |
| A10 | Y | 420 | 430 | 37 | 442 | 454 | 84 | 580 | 614 | 24 |
| A11 | Y | 424 | 518 | 93 | — | — | — | 624 | 642 | 11 |
| A12 | Y | 449 | 462 | 50 | 497 | 521 | 83 | — | — | — | at. %,
*Overlapping peaks

TABLE 12

DSC Data for Alloys Processed at PP6 Parameters

| Alloy | Glass Present | Peak #1 Onset [° C.] | Peak #1 Temp [° C.] | Peak #1 −ΔH [J/g] | Peak #2 Onset [° C.] | Peak #2 Temp [° C.] | Peak #2 −ΔH [J/g] | Peak #3 Onset [° C.] | Peak #3 Temp [° C.] | Peak #3 −ΔH [J/g] |
|---|---|---|---|---|---|---|---|---|---|---|
| A0 | Y | 390 | 413 | 22 | 454 | 456 | 56 | — | — | — |
| A1 | Y | 389 | 414 | 41 | 437 | 466 | 69 | — | — | — |
| A2 | Y | 394 | 411 | 43 | 453 | 470 | 64 | — | — | — |
| A3 | Y | 397 | 409 | 55 | 455 | 470 | 63 | — | — | — |
| A4 | Y | — | — | — | 469 | 490 | 32 | — | — | — |
| A5 | N | — | — | — | — | — | — | — | — | — |
| A6 | Y | — | — | — | 503 | 531 | 16 | — | — | — |
| A7 | N | — | — | — | — | — | — | — | — | — |
| A8 | N | — | — | — | — | — | — | — | — | — |
| A9 | N | — | — | — | — | — | — | — | — | — |
| A10 | Y | 416 | 426 | 36 | 447 | 458 | 70 | — | — | — |
| A11 | Y | 425 | 444 | 17 | 518 | 532 | 73 | — | — | — |
| A12 | Y | 450 | 461 | 33 | 519 | 527 | 57 | — | — | — |

To measure bend ductility, samples of each ribbon processed in Table 13 were corrugated using a home built corrugation system. For each sample, a meter length of uniform ribbon was selected and then this was corrugated and the total number of breaks was listed. Note that the corrugation was only done on ribbon that experienced Type 4 bending behavior. Note that if Type 4 bending behavior (bendable on both sides) was not experienced by hand bending then corrugation was not attempted since very large number of breaks would occur generally in excess of 100 over a 1 meter length.

TABLE 13

Summary on Corrugation Results - Number of Breaks per 1 meter

| Alloy | Process Parameter | | | | | |
|---|---|---|---|---|---|---|
| | PP1 | PP2 | PP3 | PP4 | PP5 | PP6 |
| A0 | 0 | 0 | 1 | 0 | 0 | >100 |
| A1 | 0 | 0 | 0 | 2 | 0 | >100 |
| A2 | 0 | 0 | 0 | 0 | 0 | >100 |
| A3 | 0 | 0 | 0 | 0 | 8 | >100 |
| A4 | 0 | 0 | 0 | 0 | 5 | >100 |
| A5 | 0 | 0 | 0 | 0 | 17 | >100 |
| A6 | 0 | >100 | 11 | 0 | 72 | >100 |
| A7 | 0 | >100 | >100 | 0 | >100 | >100 |
| A8 | 0 | 2 | 24 | 0 | >100 | >100 |
| A9 | 0 | 50 | >100 | 0 | >100 | >100 |
| A10 | 0 | 0 | 1 | 46 | 11 | 1 |
| A11 | 0 | 13 | 8 | 2 | >100 | >100 |
| A12 | 0 | 49 | 43 | >100 | >100 | 5 |

Figure 2:
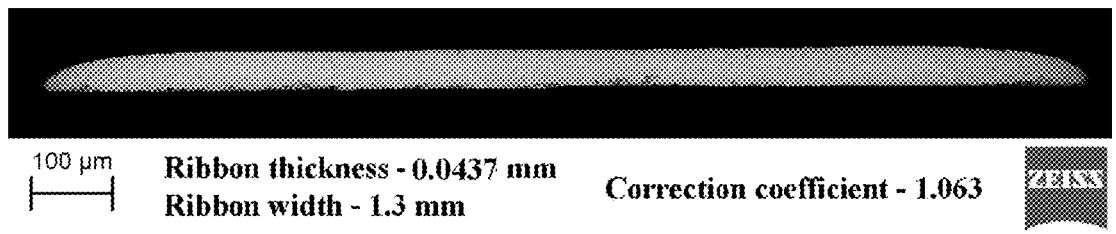
FIG. 2 SEM image of melt-spun ribbon cross section showing example correction coefficient.
Figure 3:
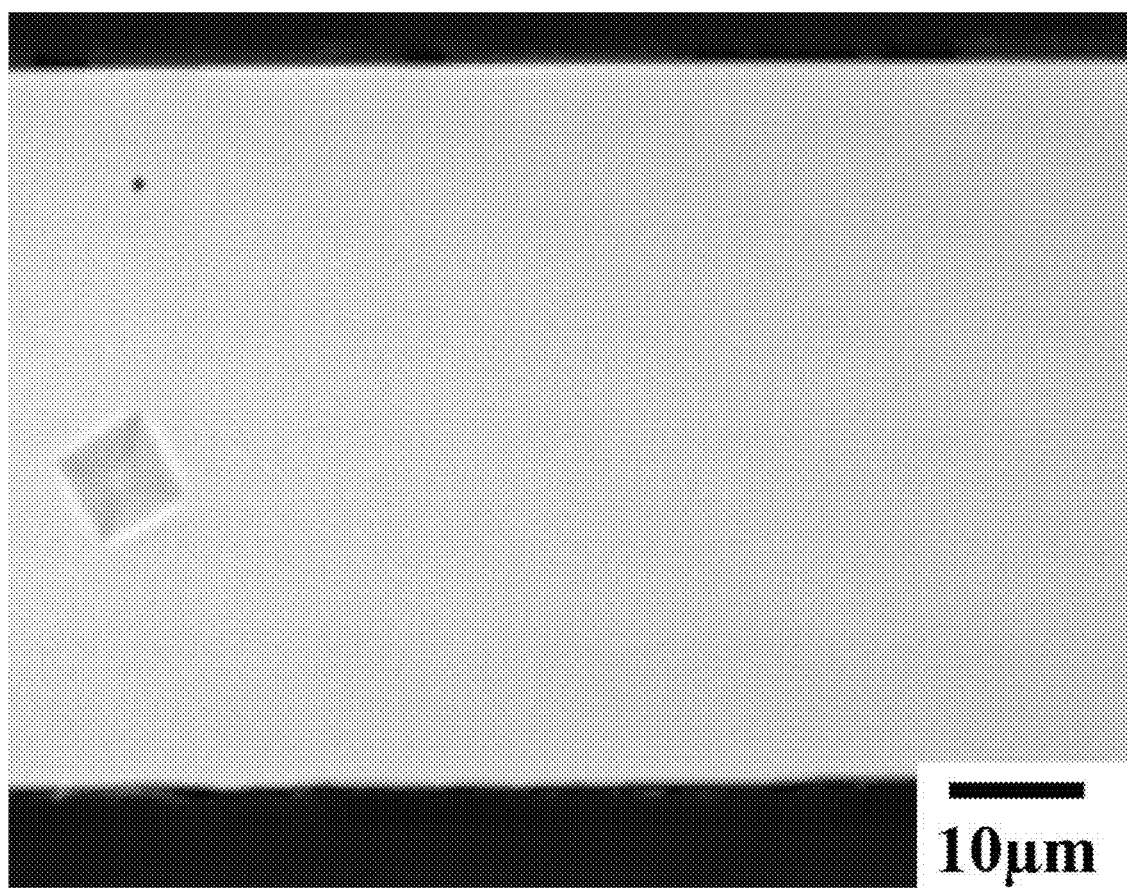
FIG. 3 SEM backscattered electron micrograph of the cross section of A2 alloy showing no structural features. Microhardness indentation mark was used to the surface is in focus.
Figure 4:
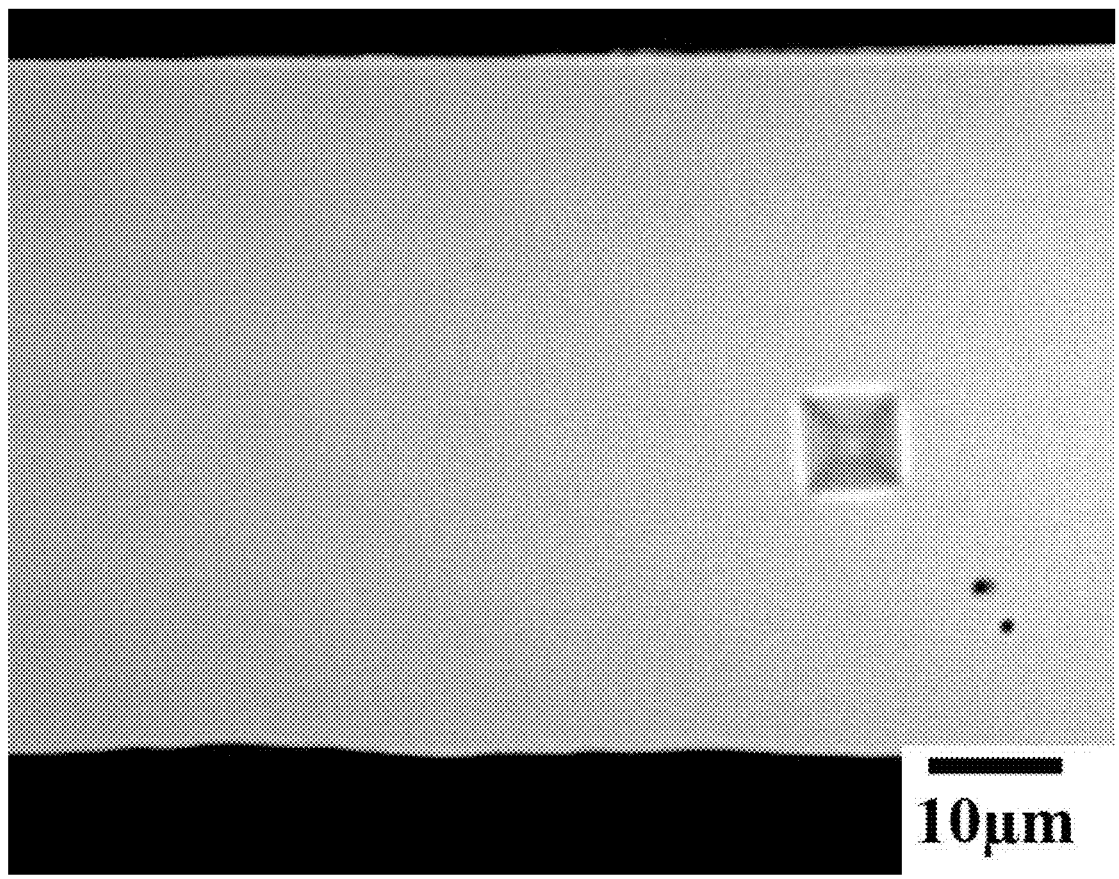
FIG. 4 SEM backscattered electron micrograph of the cross section of B2 alloy showing no structural features. Microhardness indentation mark was used to the surface is in focus.
Figure 5:
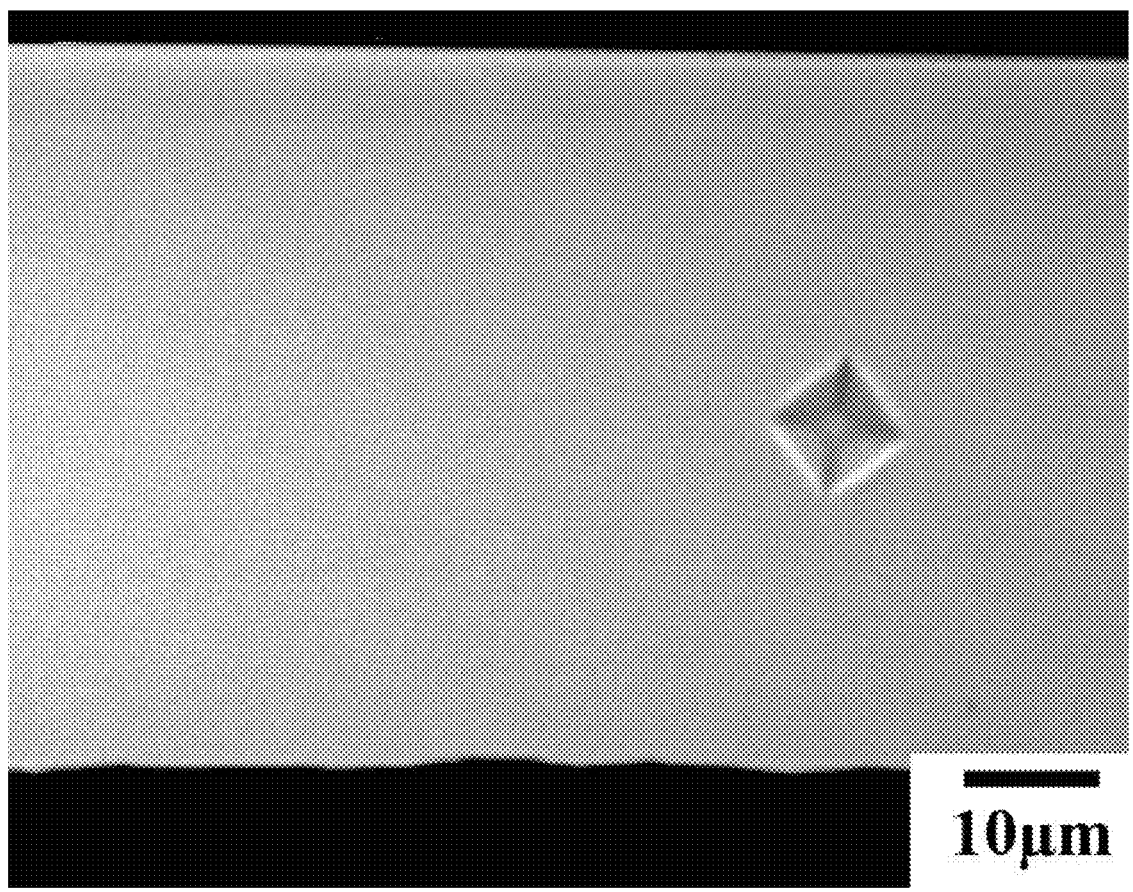
FIG. 5 SEM backscattered electron micrograph of the cross section of C2 alloy showing no structural features. Microhardness indentation mark was used to the surface is in focus.
Figure 6:
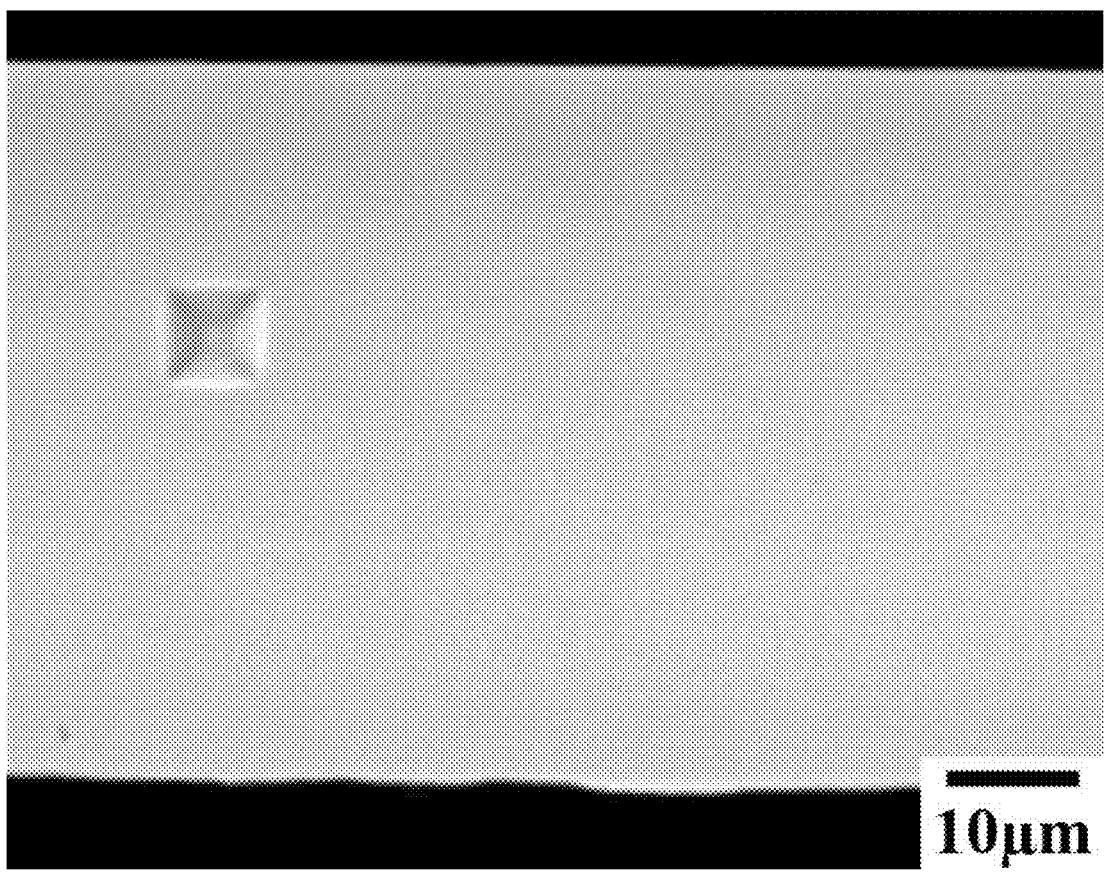
FIG. 6 SEM backscattered electron micrograph of the cross section of A2 alloy showing no structural features. Microhardness indentation mark was used to the surface is in focus.
Figure 7:
FIG. 7 SEM micrograph of the gage surface of A2 alloy showing multiple shear band formation after tensile testing.
Figure 8:
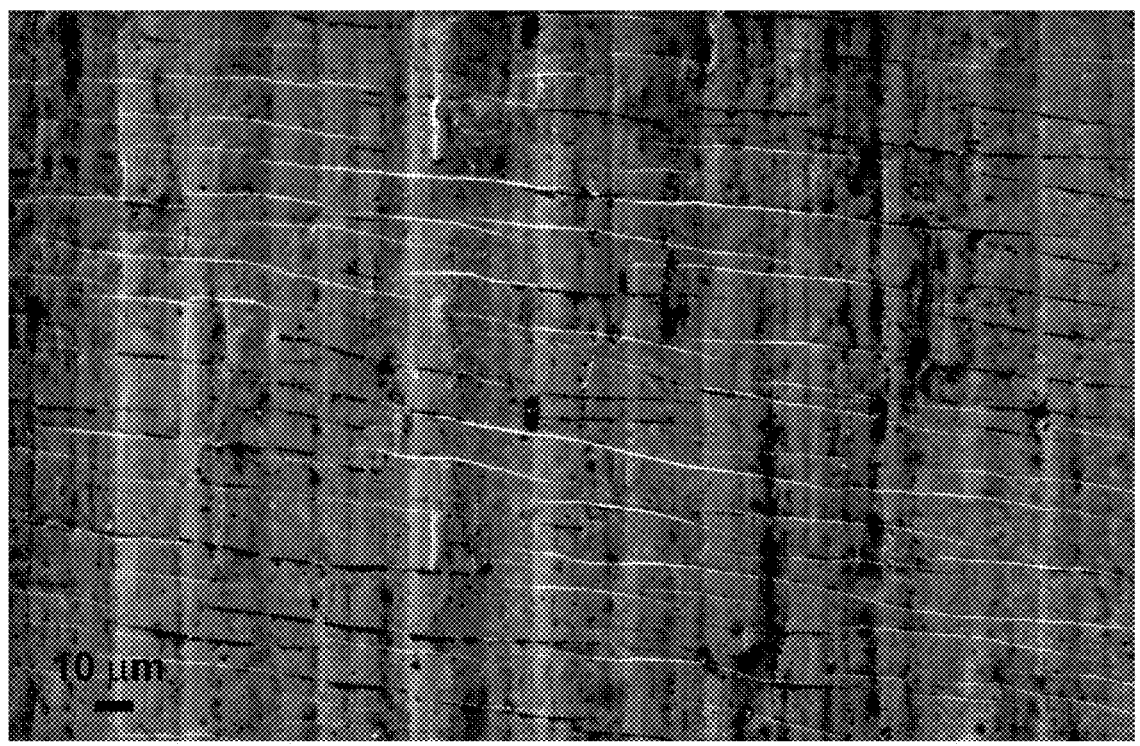
FIG. 8 SEM micrograph of the gage surface of B2 alloy showing multiple shear band formation after tensile testing.
Figure 9:
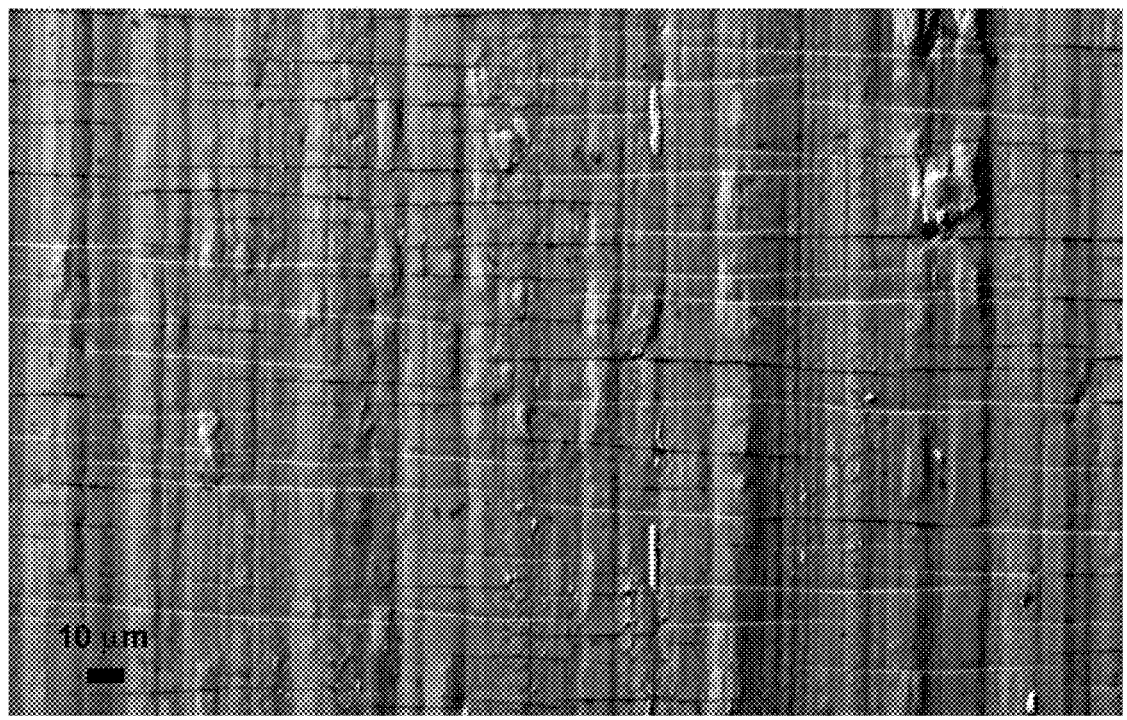
FIG. 9 SEM micrograph of the gage surface of C2 alloy showing multiple shear band formation after tensile testing.
Figure 10:
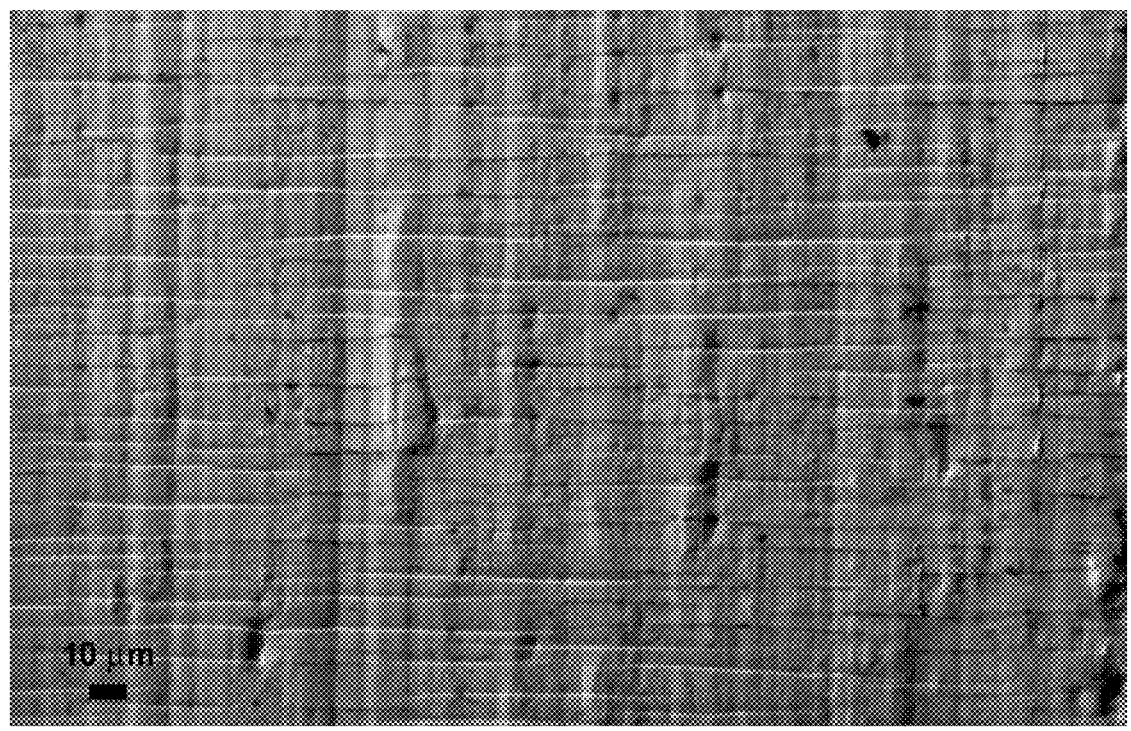
FIG. 10 SEM micrograph of the gage surface of D2 alloy showing multiple shear band formation after tensile testing.
Figure 11:
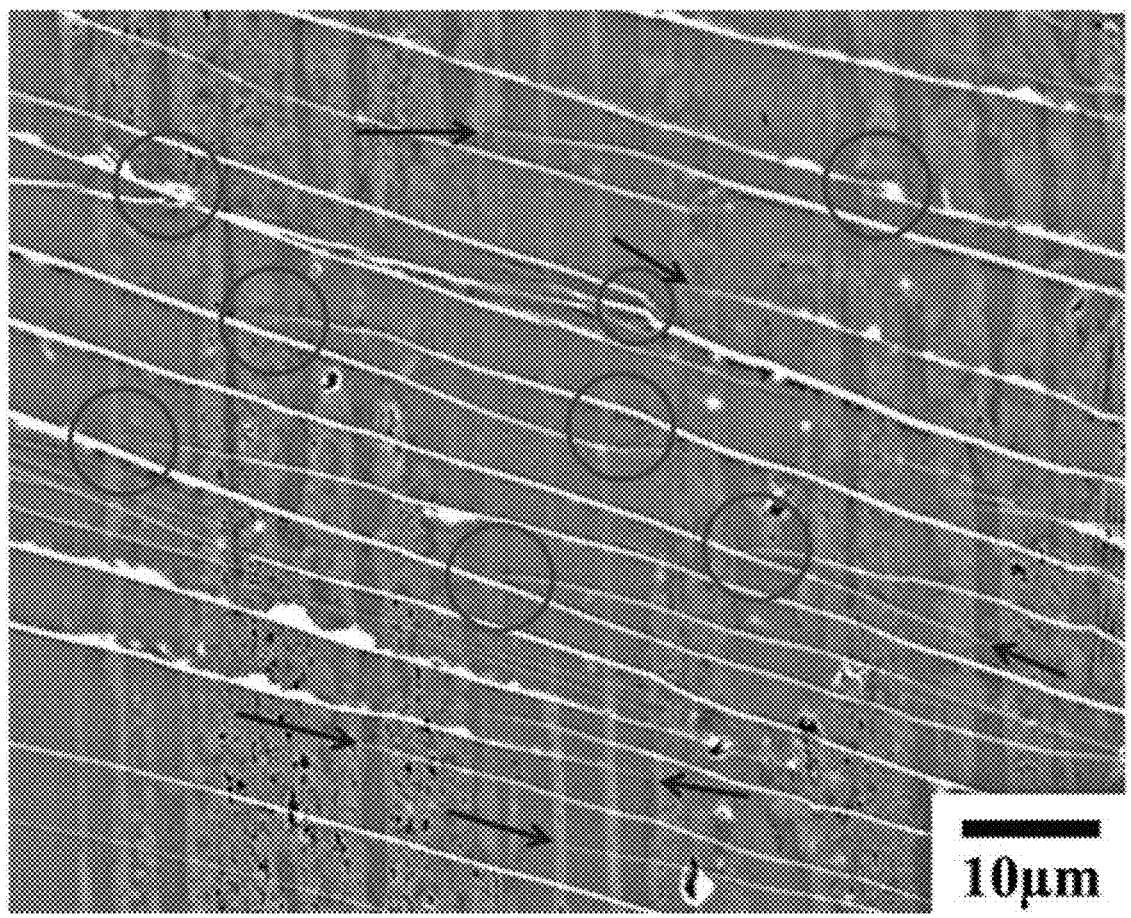
FIG. 11 SEM micrograph showing two mechanisms in A2 alloy after tensile testing: ISBB examples are illustrated by the arrows and SBAI examples are identified by the circles.
Figure 12:
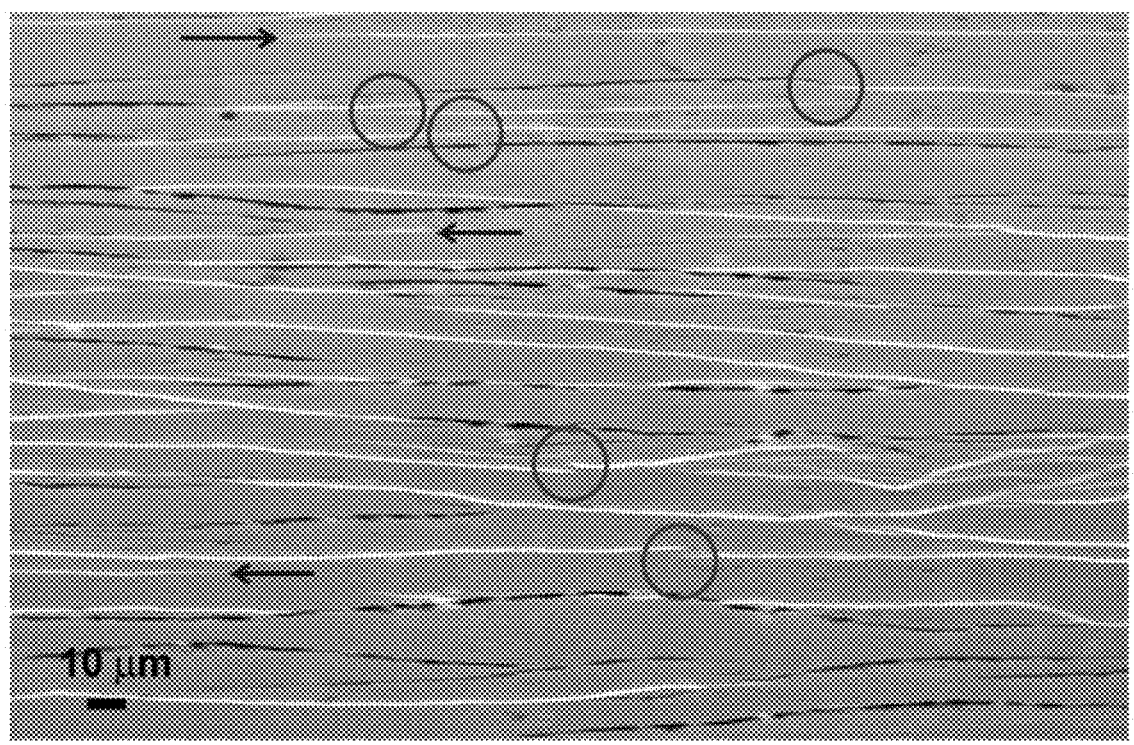
FIG. 12 SEM micrograph showing two mechanisms in B2 alloy after tensile testing: ISBB examples are illustrated by the arrows and SBAI examples are identified by the circles.
Figure 13:
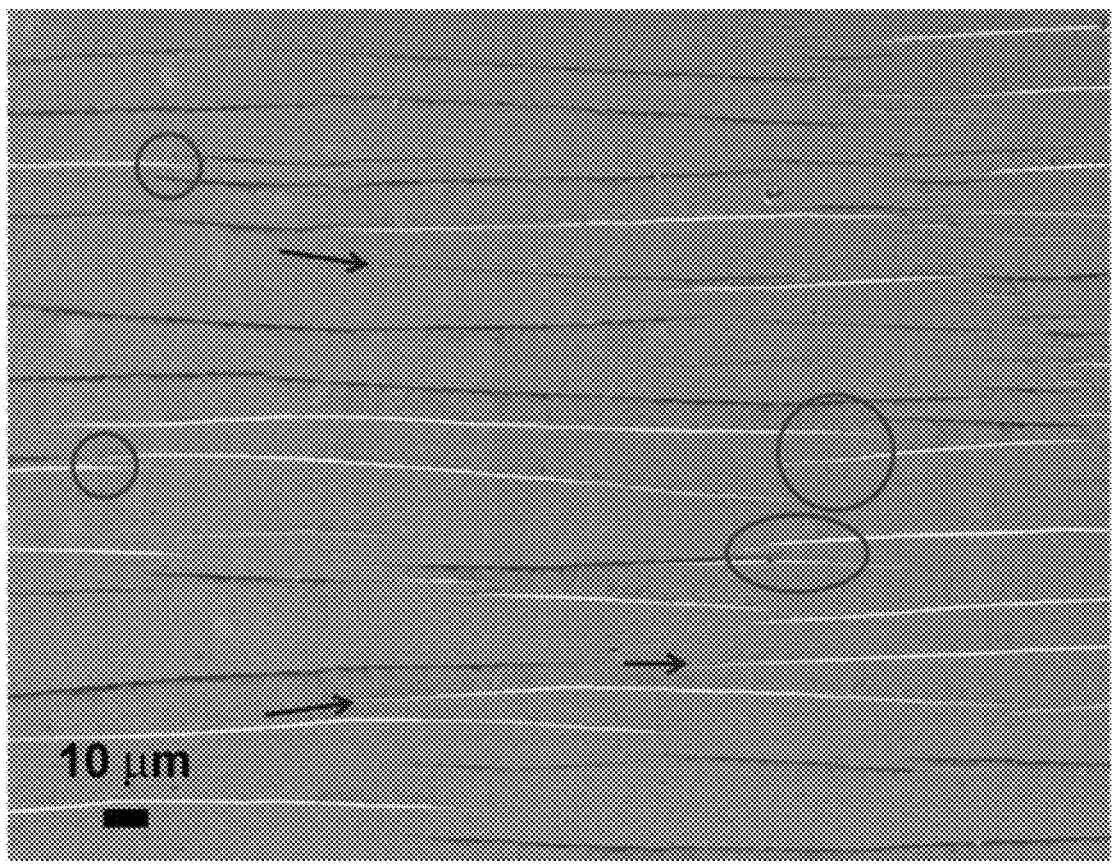
FIG. 13 SEM micrograph showing two mechanisms in C2 alloy after tensile testing: ISBB examples are illustrated by the arrows and SBAI examples are identified by the circles.
Figure 14:
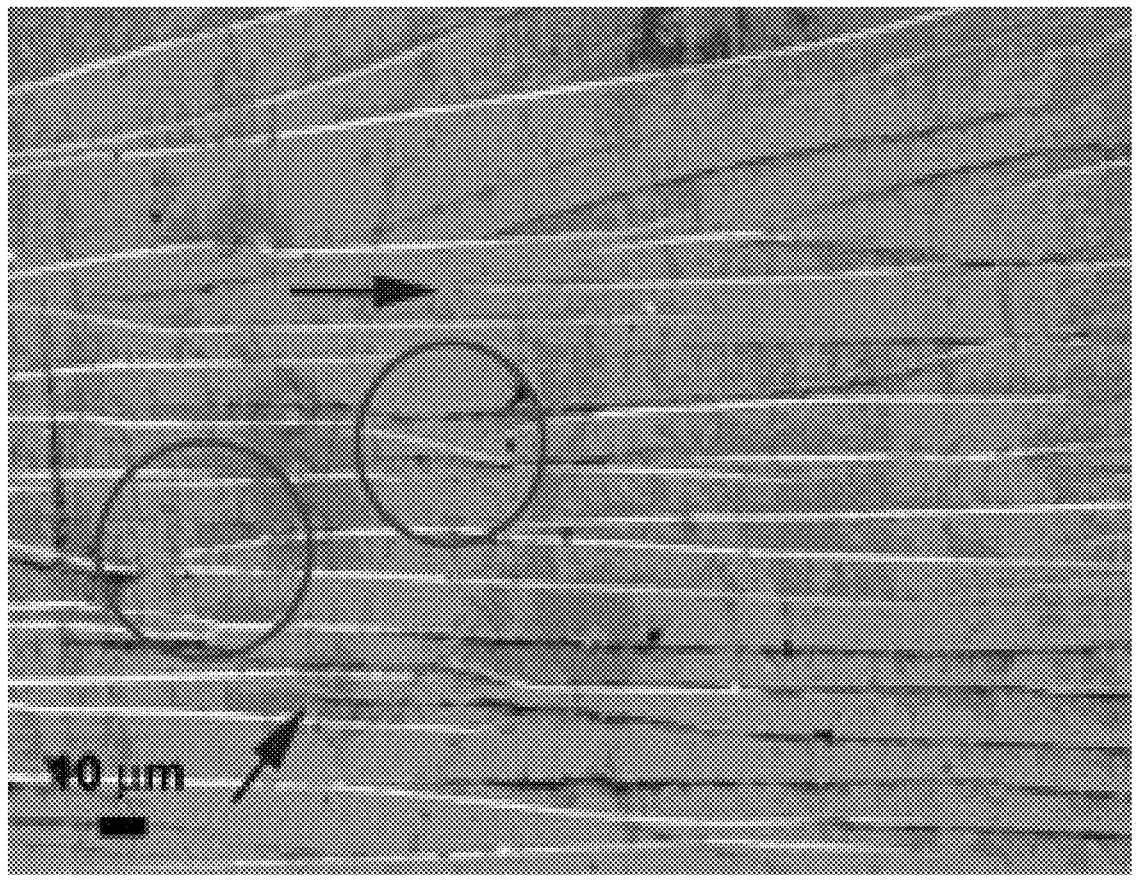
FIG. 14 SEM micrograph showing two mechanisms in D2 alloy after tensile testing: ISBB examples are illustrated by the arrows and SBAI examples are identified by the circles.
Figure 15:
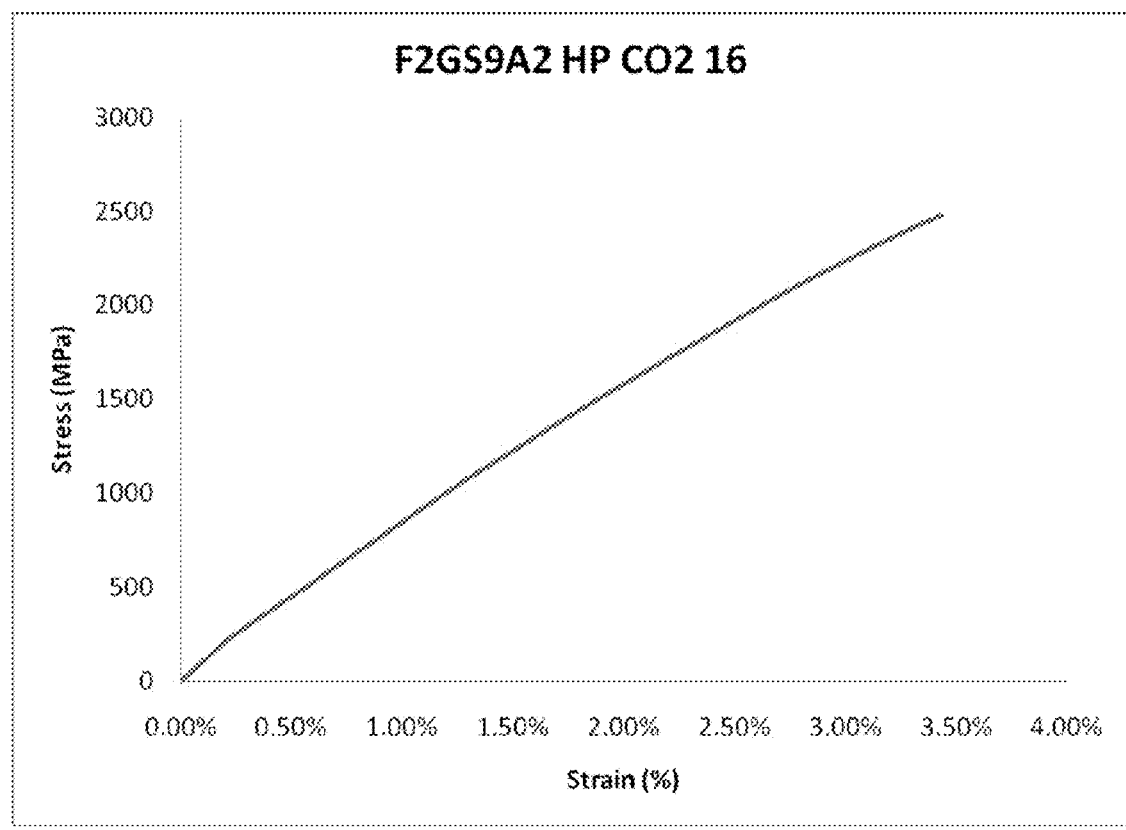
FIG. 15 Representative stress-strain curve for A2 alloy tested in tension.
Figure 16:
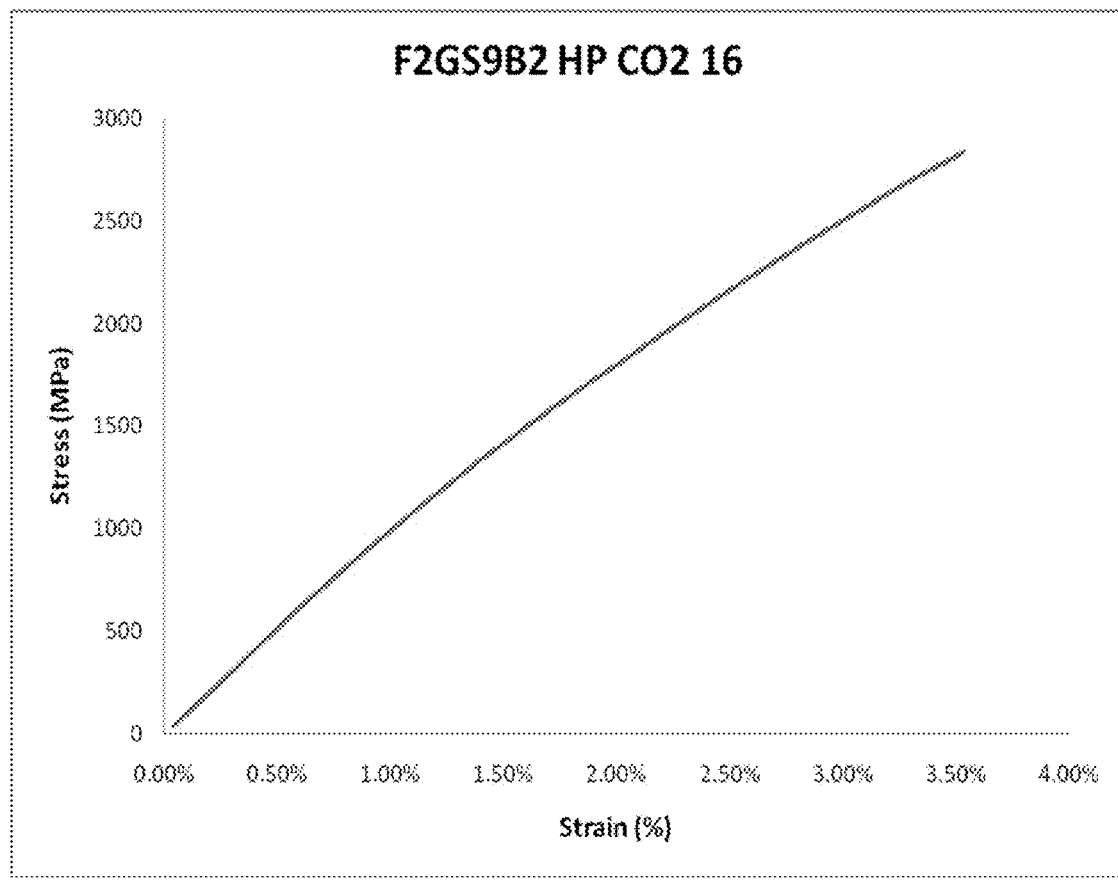
FIG. 16 Representative stress-strain curve for B2 alloy tested in tension.
Figure 17:
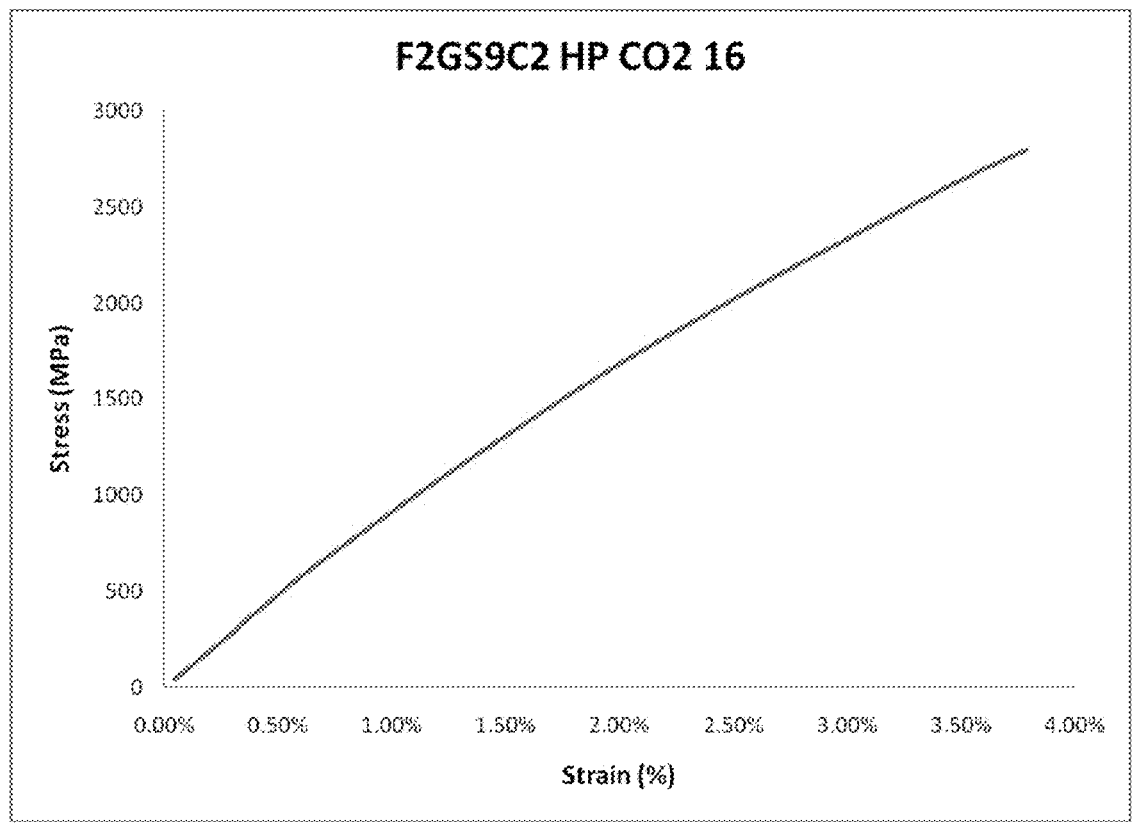
FIG. 17 Representative stress-strain curve for C2 alloy tested in tension.
Figure 18:
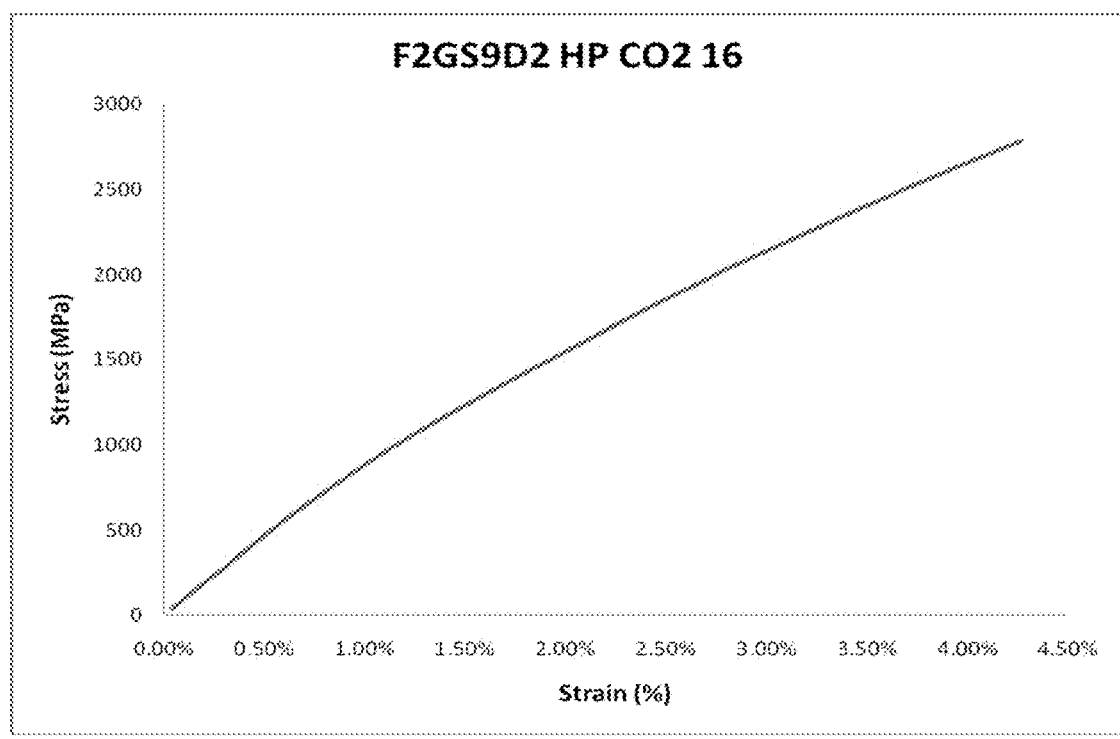
FIG. 18 Representative stress-strain curve for D2 alloy tested in tension.

The mechanical properties of metallic ribbons were obtained at room temperature using microscale tensile testing. The testing was carried out in a commercial tensile stage made by Fullam Inc., which was monitored and controlled by a MTEST Windows software program. The deformation was applied by a stepping motor through the gripping system while the load was measured by a load cell that was connected to the end of one gripping jaw. Displacement was obtained using a Linear Variable Differential Transformer (LVDT) which was attached to the two gripping jaws to measure the change of gage length. Before testing, the thickness and width of a ribbon were carefully measured for at least three times at different locations in the gage length. The average values were then recorded as gage thickness and width, and used as input parameters for subsequent stress and strain calculation. While raw mechanical test data assumes a rectangular cross section, in fact, the ribbon cross-section is curved on top as illustrated in FIG. 2 and the measured rectangular cross-section overestimates the true cross-section. The correction factor for geometrical effect was applied which was estimated to be 5% increase in measured strength characteristics (yield stress and ultimate strength). All tests were performed under displacement control, with a strain rate of ~0.001 s$^{-1}$. In Tables 14-18, a summary of the tensile test results including gage dimensions, elongation, breaking load, yield stress, ultimate strength and Young's Modulus are shown for the A-Series alloys that have been melt-spun at process conditions specified in Table 3. All A-Series alloys processed with at PP6 melt-spinning conditions are brittle and not tested in tension. Note that each distinct sample was measured in triplicate to account for the variability of this test method and sample quality, including the presence of macro-defects in the sample. As can be seen the tensile strength values are relatively high and vary from 1.00 GPa to 2.86 GPa with the total elongation values from 1.0% to 5.5%. Note that the results shown in Table 6 have been adjusted for machine compliance.

TABLE 14

Tensile Properties for Alloys Processed at PP1 Parameters

| Alloy | Gage Dimensions (mm) | | | Elong. (%) | Break Load (N) | Strength (GPa) | | Young's Modulus (GPa) |
|---|---|---|---|---|---|---|---|---|
| | W | T | L | | | Yield | UTS | |
| A0 | 1.31 | 0.043 | 9.00 | 3.17 | 131 | 2.15 | 2.44 | 70 |
| | 1.35 | 0.042 | 9.00 | 3.57 | 136 | 1.75 | 2.51 | 66 |
| | 1.34 | 0.044 | 9.00 | 4.31 | 147 | 1.81 | 2.61 | 62 |
| A1 | 1.39 | 0.042 | 9.00 | 3.04 | 141 | 2.5 | 2.54 | 83 |
| | 1.38 | 0.040 | 9.00 | 2.92 | 137 | 2.53 | 2.60 | 89 |
| | 1.28 | 0.042 | 9.00 | 3.96 | 139 | 2.12 | 2.71 | 70 |
| A2 | 1.05 | 0.041 | 9.00 | 3.84 | 103 | 1.73 | 2.51 | 75 |
| | 1.08 | 0.039 | 9.00 | 4.17 | 108 | 1.58 | 2.70 | 81 |
| | 1.15 | 0.039 | 9.00 | 3.73 | 95 | 1.37 | 2.22 | 69 |
| A3 | 1.23 | 0.042 | 9.00 | 3.36 | 125 | 2.37 | 2.54 | 77 |
| | 1.26 | 0.042 | 9.00 | 2.8 | 129 | 2.26 | 2.56 | 99 |
| | 1.30 | 0.043 | 9.00 | 3.44 | 136 | 1.82 | 2.55 | 84 |
| A4 | 1.23 | 0.038 | 9.00 | 3.17 | 116 | 2.07 | 2.60 | 78 |
| | 1.24 | 0.039 | 9.00 | 3.11 | 113 | 2.13 | 2.46 | 84 |
| | 1.25 | 0.038 | 9.00 | 3.23 | 110 | 1.74 | 2.44 | 86 |
| A5 | 1.32 | 0.039 | 9.00 | 2.86 | 134 | 2.37 | 2.73 | 102 |
| | 1.30 | 0.039 | 9.00 | 3.44 | 127 | 1.77 | 2.63 | 88 |
| | 1.25 | 0.040 | 9.00 | 3.36 | 125 | 2.14 | 2.61 | 85 |
| A6 | 1.39 | 0.041 | 9.00 | 3.51 | 136 | 1.97 | 2.50 | 78 |
| | 1.42 | 0.041 | 9.00 | 2.80 | 136 | 2.43 | 2.46 | 91 |
| | 1.38 | 0.041 | 9.00 | 3.07 | 139 | 2.07 | 2.58 | 83 |
| A7 | 1.42 | 0.041 | 9.00 | 3.44 | 139 | 1.95 | 2.50 | 78 |
| | 1.39 | 0.040 | 9.00 | 2.83 | 125 | 2.05 | 2.36 | 90 |
| | 1.45 | 0.040 | 9.00 | 2.94 | 140 | 2.25 | 2.53 | 94 |
| A8 | 1.40 | 0.039 | 9.00 | 2.33 | 126 | 2.40 | 2.44 | 89 |
| | 1.42 | 0.039 | 9.00 | 2.61 | 134 | 2.44 | 2.54 | 85 |
| | 1.40 | 0.039 | 9.00 | 3.06 | 132 | 2.43 | 2.55 | 73 |
| A9 | 1.39 | 0.039 | 9.00 | 2.80 | 133 | 2.37 | 2.58 | 98 |
| | 1.34 | 0.040 | 9.00 | 2.99 | 127 | 2.48 | 2.49 | 83 |
| | 1.39 | 0.040 | 9.00 | 3.09 | 137 | 2.57 | 2.59 | 87 |
| A10 | 1.33 | 0.044 | 9.00 | 3.77 | 155 | 1.88 | 2.65 | 82 |
| | 1.33 | 0.042 | 9.00 | 3.67 | 155 | 1.46 | 2.77 | 95 |
| | 1.36 | 0.044 | 9.00 | 3.64 | 156 | 1.78 | 2.61 | 85 |
| A11 | 1.46 | 0.042 | 9.00 | 3.19 | 154 | 2.03 | 2.51 | 88 |
| | 1.42 | 0.044 | 9.00 | 3.14 | 155 | 1.57 | 2.48 | 95 |
| | 1.39 | 0.043 | 9.00 | 3.36 | 145 | 1.51 | 2.42 | 86 |
| A12 | 1.38 | 0.045 | 9.00 | 3.56 | 162 | 1.45 | 2.61 | 95 |
| | 1.36 | 0.045 | 9.00 | 3.31 | 154 | 1.50 | 2.51 | 93 |
| | 1.41 | 0.045 | 9.00 | 3.34 | 158 | 1.87 | 2.49 | 85 |

TABLE 15

Tensile Properties for Alloys Processed at PP2 Parameters

| Alloy | Gage Dimensions (mm) | | | Elong. (%) | Break Load (N) | Strength (GPa) | | Young's Modulus (GPa) |
|---|---|---|---|---|---|---|---|---|
| | W | T | L | | | Yield | UTS | |
| A0 | 1.42 | 0.040 | 9.00 | 3.88 | 138 | 1.86 | 2.55 | 66 |
| | 1.38 | 0.040 | 9.00 | 3.58 | 132 | 2.07 | 2.52 | 66 |
| | 1.43 | 0.039 | 9.00 | 3.39 | 132 | 1.77 | 2.48 | 76 |
| A1 | 1.23 | 0.036 | 10.49 | 3.81 | 110 | 1.93 | 2.60 | 76 |
| | 1.26 | 0.035 | 9.14 | 3.34 | 111 | 2.10 | 2.64 | 84 |
| | 1.25 | 0.035 | 9.76 | 3.10 | 105 | 2.13 | 2.52 | 86 |
| A2 | 1.22 | 0.036 | 9.00 | 3.76 | 108 | 1.54 | 2.57 | 83 |
| | 1.15 | 0.037 | 9.00 | 3.82 | 102 | 1.58 | 2.51 | 79 |
| | 1.13 | 0.035 | 9.00 | 4.73 | 94 | 1.42 | 2.50 | 63 |
| A3 | 1.25 | 0.034 | 10.66 | 3.47 | 109 | 1.95 | 2.57 | 85 |
| | 1.23 | 0.037 | 11.04 | 2.85 | 103 | 2.31 | 2.38 | 86 |
| | 1.30 | 0.036 | 10.11 | 2.97 | 113 | 1.86 | 2.54 | 104 |
| A4 | 1.47 | 0.040 | 10.32 | 2.72 | 123 | 2.06 | 2.19 | 78 |
| | 1.40 | 0.044 | 10.73 | 1.21 | 62 | 0.87 | 1.06 | 88 |
| | 1.52 | 0.037 | 10.99 | 2.57 | 104 | 1.62 | 1.94 | 82 |

TABLE 15-continued

Tensile Properties for Alloys Processed at PP2 Parameters

| Alloy | Gage Dimensions (mm) | | | Elong. (%) | Break Load (N) | Strength (GPa) | | Young's Modulus (GPa) |
|---|---|---|---|---|---|---|---|---|
| | W | T | L | | | Yield | UTS | |
| A5 | 1.42 | 0.051 | 9.00 | 4.61 | 184 | 1.97 | 2.67 | 62 |
| | 1.45 | 0.052 | 9.17 | 3.76 | 195 | 1.89 | 2.70 | 82 |
| | 1.46 | 0.053 | 9.00 | 4.26 | 187 | 1.60 | 2.54 | 68 |
| A6 | | | | BRITTLE | | | | |
| A7 | | | | BRITTLE | | | | |
| A8 | 1.57 | 0.039 | 9.00 | 0.84 | 60 | 0.86 | 1.03 | 77 |
| | 1.60 | 0.040 | 9.00 | 1.98 | 111 | 1.69 | 1.82 | 82 |
| | 1.58 | 0.040 | 9.00 | 2.53 | 123 | 1.70 | 2.04 | 71 |
| A9 | 1.67 | 0.040 | 9.00 | 1.02 | 42 | 0.54 | 1.66 | 61 |
| | 1.55 | 0.040 | 9.00 | 1.86 | 82 | 1.27 | 1.39 | 77 |
| | 1.59 | 0.041 | 9.00 | 1.38 | 70 | 1.06 | 1.13 | 71 |
| A10 | 1.35 | 0.040 | 9.00 | 3.29 | 145 | 2.33 | 2.69 | 91 |
| | 1.31 | 0.041 | 9.00 | 3.24 | 139 | 2.21 | 2.58 | 90 |
| | 1.35 | 0.041 | 9.00 | 3.68 | 155 | 2.46 | 2.80 | 85 |
| A11 | 1.52 | 0.041 | 9.00 | 3.26 | 153 | 2.41 | 2.46 | 81 |
| | 1.48 | 0.040 | 9.00 | 2.42 | 123 | 2.05 | 2.08 | 92 |
| | 1.48 | 0.040 | 9.00 | 3.47 | 141 | 1.82 | 2.38 | 94 |
| A12 | 1.37 | 0.046 | 9.00 | 1.70 | 85 | 1.24 | 1.34 | 82 |
| | 1.43 | 0.047 | 9.00 | 2.89 | 129 | 1.90 | 1.92 | 71 |
| | 1.42 | 0.046 | 9.00 | 3.20 | 143 | 1.71 | 2.19 | 80 |

TABLE 16

Tensile Properties for Alloys Processed at PP3 Parameters

| Alloy | Gage Dimensions (mm) | | | Elong. (%) | Break Load (N) | Strength (GPa) | | Young's Modulus (GPa) |
|---|---|---|---|---|---|---|---|---|
| | W | T | L | | | Yield | UTS | |
| A0 | 1.34 | 0.054 | 9.49 | 3.13 | 186 | 2.32 | 2.70 | 93 |
| | 1.34 | 0.056 | 9.62 | 3.16 | 192 | 2.04 | 2.69 | 95 |
| | 1.36 | 0.055 | 9.07 | 2.76 | 176 | 2.36 | 2.48 | 94 |
| A1 | 1.50 | 0.057 | 9.00 | 3.68 | 212 | 1.58 | 2.59 | 86 |
| | 1.45 | 0.059 | 9.00 | 3.84 | 223 | 1.86 | 2.74 | 82 |
| | 1.48 | 0.057 | 9.00 | 3.68 | 215 | 1.73 | 2.68 | 87 |
| A2 | 1.31 | 0.053 | 9.00 | 1.80 | 93 | 1.33 | 1.41 | 79 |
| | 1.44 | 0.047 | 9.00 | 2.03 | 106 | 1.63 | 1.64 | 83 |
| | 1.47 | 0.046 | 9.10 | 1.95 | 98 | 1.45 | 1.51 | 81 |
| A3 | 1.34 | 0.055 | 10.41 | 5.50 | 195 | 1.68 | 2.78 | 56 |
| | 1.31 | 0.055 | 10.89 | 4.13 | 186 | 1.71 | 2.71 | 77 |
| | 1.41 | 0.054 | 10.15 | 4.39 | 187 | 1.76 | 2.57 | 68 |
| A4 | 1.50 | 0.052 | 10.03 | 4.37 | 208 | 1.44 | 2.80 | 83 |
| | 1.58 | 0.053 | 10.47 | 3.28 | 195 | 2.40 | 2.45 | 73 |
| | 1.52 | 0.058 | 10.61 | 4.81 | 211 | 1.79 | 2.51 | 60 |
| A5 | 1.54 | 0.055 | 10.68 | 3.45 | 217 | 2.12 | 2.69 | 86 |
| | 1.60 | 0.057 | 10.05 | 3.35 | 205 | 1.72 | 2.36 | 88 |
| | 1.60 | 0.053 | 10.50 | 3.16 | 205 | 2.42 | 2.54 | 77 |
| A6 | 1.51 | 0.057 | 9 | 2.756 | 193 | 2.06 | 2.35 | 80 |
| | 1.53 | 0.058 | 9 | 3.2 | 212 | 2.36 | 2.51 | 81 |
| | 1.50 | 0.057 | 9.00 | 2.56 | 207 | 2.55 | 2.55 | 86 |
| A7 | 1.60 | 0.054 | 9.00 | 2.56 | 204 | 2.33 | 2.48 | 89 |
| | 1.48 | 0.056 | 9.00 | 2.50 | 185 | 2.16 | 2.34 | 85 |
| | 1.54 | 0.057 | 9.00 | 2.31 | 170 | 1.49 | 2.04 | 85 |
| A8 | 1.36 | 0.048 | 10.18 | 3.68 | 163 | 1.87 | 2.61 | 109 |
| | 1.32 | 0.051 | 10.89 | 3.02 | 169 | 2.11 | 2.64 | 93 |
| | 1.27 | 0.049 | 11.20 | 3.53 | 173 | 2.81 | 2.92 | 96 |
| A9 | | | | BRITTLE | | | | |
| A10 | 1.45 | 0.064 | 9.00 | 4.01 | 236 | 1.46 | 2.54 | 86 |
| | 1.46 | 0.061 | 9.00 | 4.12 | 239 | 1.57 | 2.68 | 84 |
| | 1.43 | 0.061 | 9.00 | 4.10 | 232 | 1.35 | 2.67 | 92 |
| A11 | 1.60 | 0.060 | 9.00 | 3.74 | 249 | 1.69 | 2.60 | 86 |
| | 1.57 | 0.062 | 9.00 | 3.97 | 254 | 1.89 | 2.60 | 78 |
| | 1.59 | 0.061 | 9.00 | 3.73 | 252 | 1.70 | 2.60 | 86 |
| A12 | 1.64 | 0.058 | 9.00 | 3.86 | 242 | 1.73 | 2.54 | 81 |
| | 1.61 | 0.058 | 9.00 | 2.71 | 184 | 1.77 | 1.98 | 82 |
| | 1.67 | 0.059 | 9.00 | 3.84 | 254 | 1.88 | 2.58 | 77 |

TABLE 17

Tensile Properties for Alloys Processed at PP4 Parameters

| Alloy | Gage Dimensions (mm) | | | Elong. (%) | Break Load (N) | Strength (GPa) | | Young's Modulus (GPa) |
|---|---|---|---|---|---|---|---|---|
| | W | T | L | | | Yield | UTS | |
| A1 | 1.34 | 0.054 | 9.49 | 3.13 | 186 | 2.32 | 2.70 | 93 |
| | 1.34 | 0.056 | 9.62 | 3.16 | 192 | 2.04 | 2.69 | 95 |
| | 1.36 | 0.055 | 9.07 | 2.76 | 176 | 2.36 | 2.48 | 94 |
| A2 | 1.50 | 0.057 | 9.00 | 3.68 | 212 | 1.58 | 2.59 | 86 |
| | 1.45 | 0.059 | 9.00 | 3.84 | 223 | 1.86 | 2.74 | 82 |
| | 1.48 | 0.057 | 9.00 | 3.68 | 215 | 1.73 | 2.68 | 87 |
| | 1.31 | 0.053 | 9.00 | 1.80 | 93 | 1.33 | 1.41 | 79 |
| A3 | 1.44 | 0.047 | 9.00 | 2.03 | 106 | 1.63 | 1.64 | 83 |
| | 1.47 | 0.046 | 9.10 | 1.95 | 98 | 1.45 | 1.51 | 81 |
| | 1.34 | 0.055 | 10.41 | 5.50 | 195 | 1.68 | 2.78 | 56 |
| A4 | 1.31 | 0.055 | 10.89 | 4.13 | 186 | 1.71 | 2.71 | 77 |
| | 1.41 | 0.054 | 10.15 | 4.39 | 187 | 1.76 | 2.57 | 68 |
| | 1.50 | 0.052 | 10.03 | 4.37 | 208 | 1.44 | 2.80 | 83 |
| A5 | 1.58 | 0.053 | 10.47 | 3.28 | 195 | 2.40 | 2.45 | 73 |
| | 1.52 | 0.058 | 10.61 | 4.81 | 211 | 1.79 | 2.51 | 60 |
| | 1.54 | 0.055 | 10.68 | 3.45 | 217 | 2.12 | 2.69 | 86 |
| A6 | 1.60 | 0.057 | 10.05 | 3.35 | 205 | 1.72 | 2.36 | 88 |
| | 1.60 | 0.053 | 10.50 | 3.16 | 205 | 2.42 | 2.54 | 77 |
| | 1.51 | 0.057 | 9.00 | 2.76 | 193 | 2.06 | 2.35 | 80 |
| A7 | 1.53 | 0.058 | 9.00 | 3.20 | 212 | 2.36 | 2.51 | 81 |
| | 1.50 | 0.057 | 9.00 | 2.56 | 207 | 2.55 | 2.55 | 86 |
| | 1.60 | 0.054 | 9.00 | 2.56 | 204 | 2.33 | 2.48 | 89 |
| A8 | 1.48 | 0.056 | 9.00 | 2.50 | 185 | 2.16 | 2.34 | 85 |
| | 1.54 | 0.057 | 9.00 | 2.31 | 170 | 1.49 | 2.04 | 85 |
| | 1.36 | 0.048 | 10.18 | 3.68 | 163 | 1.87 | 2.61 | 109 |
| A9 | 1.32 | 0.051 | 10.89 | 3.02 | 169 | 2.11 | 2.64 | 93 |
| | 1.27 | 0.049 | 11.20 | 3.53 | 173 | 2.81 | 2.92 | 96 |
| | | | | BRITTLE | | | | |
| A10 | 1.45 | 0.064 | 9.00 | 4.01 | 236 | 1.46 | 2.54 | 86 |
| | 1.46 | 0.061 | 9.00 | 4.12 | 239 | 1.57 | 2.68 | 84 |
| | 1.43 | 0.061 | 9.00 | 4.10 | 232 | 1.35 | 2.67 | 92 |
| A11 | 1.60 | 0.060 | 9.00 | 3.74 | 249 | 1.69 | 2.60 | 86 |
| | 1.57 | 0.062 | 9.00 | 3.97 | 254 | 1.89 | 2.60 | 78 |
| | 1.59 | 0.061 | 9.00 | 3.73 | 252 | 1.70 | 2.60 | 86 |
| A12 | 1.64 | 0.058 | 9.00 | 3.86 | 242 | 1.73 | 2.54 | 81 |
| | 1.61 | 0.058 | 9.00 | 2.71 | 184 | 1.77 | 1.98 | 82 |
| | 1.67 | 0.059 | 9.00 | 3.84 | 254 | 1.88 | 2.58 | 77 |

TABLE 18

Tensile Properties for Alloys Processed at PP5 Parameters

| Alloy | Gage Dimensions (mm) | | | Elong. (%) | Break Load (N) | Strength (GPa) | | Young's Modulus (GPa) |
|---|---|---|---|---|---|---|---|---|
| | W | T | L | | | Yield | UTS | |
| A0 | 1.48 | 0.053 | 9.00 | 4.89 | 200 | 1.61 | 2.68 | 64 |
| | 1.39 | 0.055 | 9.00 | 4.22 | 201 | 1.26 | 2.76 | 82 |
| | 1.37 | 0.057 | 9.00 | 3.22 | 173 | 1.55 | 2.33 | 76 |
| A1 | 1.32 | 0.055 | 9.00 | 3.11 | 181 | 2.07 | 2.61 | 79 |
| | 1.34 | 0.052 | 9.00 | 3.21 | 171 | 1.79 | 2.58 | 95 |
| | 1.26 | 0.054 | 9.00 | 2.99 | 165 | 2.55 | 2.55 | 85 |
| A2 | 1.41 | 0.053 | 9.00 | 4.49 | 187 | 1.41 | 2.64 | 70 |
| | 1.42 | 0.056 | 9.00 | 4.32 | 198 | 1.48 | 2.61 | 83 |
| | 1.39 | 0.055 | 9.00 | 4.29 | 201 | 1.46 | 2.76 | 82 |
| A3 | 1.34 | 0.047 | 10.44 | 4.22 | 149 | 2.42 | 2.48 | 58 |
| | 1.38 | 0.048 | 10.81 | 3.52 | 165 | 1.79 | 2.61 | 83 |
| | 1.34 | 0.048 | 10.18 | 3.05 | 118 | 1.47 | 1.93 | 74 |
| A4 | 1.41 | 0.053 | 10.00 | 2.55 | 174 | 2.38 | 2.45 | 104 |
| | 1.43 | 0.053 | 9.75 | 2.97 | 160 | 1.73 | 2.23 | 83 |
| | 1.37 | 0.049 | 9.62 | 2.81 | 159 | 2.49 | 2.50 | 90 |

TABLE 18-continued

Tensile Properties for Alloys Processed at PP5 Parameters

| Alloy | Gage Dimensions (mm) | | | Elong. (%) | Break Load (N) | Strength (GPa) | | Young's Modulus (GPa) |
|---|---|---|---|---|---|---|---|---|
| | W | T | L | | | Yield | UTS | |
| A5 | 1.44 | 0.055 | 10.02 | 1.37 | 100 | 1.22 | 1.32 | 98 |
| | 1.44 | 0.052 | 10.15 | 3.03 | 143 | 1.34 | 2.01 | 74 |
| | 1.47 | 0.051 | 10.33 | 2.90 | 161 | 2.25 | 2.25 | 79 |
| A6 | 1.35 | 0.052 | 10.08 | 2.49 | 166 | 2.33 | 2.48 | 108 |
| | 1.38 | 0.052 | 10.41 | 2.79 | 149 | 2.16 | 2.17 | 80 |
| | 1.34 | 0.050 | 10.64 | 2.49 | 156 | 2.45 | 2.45 | 102 |
| A7 | BRITTLE | | | | | | | |
| A8 | BRITTLE | | | | | | | |
| A9 | BRITTLE | | | | | | | |
| A10 | 1.63 | 0.056 | 9.00 | 3.84 | 236 | 1.63 | 2.58 | 84 |
| | 1.57 | 0.056 | 9.00 | 3.66 | 226 | 1.65 | 2.57 | 91 |
| | 1.59 | 0.059 | 9.00 | 3.97 | 253 | 1.35 | 2.70 | 100 |
| A11 | BRITTLE | | | | | | | |
| A12 | BRITTLE | | | | | | | |

Example 3

Using high purity elements, 15 g high purity (HP) feedstock of A2 alloy were weighed out according to the atomic ratio provided in Table 1. Using ferroadditive and other readily commercially available constituents, 15 g commercial purity (CP) feedstock (up to 10 at % impurity) of A2 alloy were weighed out according to the atomic ratio provided in Table 1. The feedstock material was then placed into the copper hearth of an arc-melting system. The feedstock was arc-melted into an ingot using high purity argon as a shielding gas. The ingots were flipped several times and re-melted to ensure homogeneity. After mixing, the ingots were then cast in the form of a finger approximately 12 mm wide by 30 mm long and 8 mm thick. The resulting fingers were then placed in a melt-spinning chamber in a quartz crucible with a hole diameter of ~0.81 mm. The ingots were melted in different atmosphere using RF induction and then ejected onto a 245 mm diameter copper wheel which was traveling at different tangential velocities. The resulting ribbons that were produced had widths which were typically 1.25 mm and thickness from 0.020 to 0.060 mm.

The process parameters used to process the samples of the A2 alloy are shown in Table 19. As indicated, different wheel tangential velocities were used in a range from 16 m/s to 25 m/s. The variation in wheel tangential velocity gives an indication of process window since the wheel tangential velocity will be a prime factor controlling ribbon thickness which affects cooling rate of the material. The processing atmosphere was varied to include processing in helium, air, and carbon dioxide. All samples were processed at ⅓ atm chamber pressure except that for PP9 conditions when the samples were processed at full atmosphere (Table 19).

TABLE 19

Summary of Key Processing Variations

| | Processing Parameters | | | | | | | | |
|---|---|---|---|---|---|---|---|---|---|
| | PP1 | PP2 | PP3 | PP4 | PP5 | PP6 | PP7 | PP8 | PP9 |
| Wheel Speed (m/s) | 25 | 25 | 16 | 16 | 16 | 16 | 22.5 | 20 | 25 |

TABLE 19-continued

Summary of Key Processing Variations

| | Processing Parameters | | | | | | | | |
|---|---|---|---|---|---|---|---|---|---|
| | PP1 | PP2 | PP3 | PP4 | PP5 | PP6 | PP7 | PP8 | PP9 |
| Atmosphere | ⅓ He | ⅓ Air | ⅓ He | ⅓ $CO_2$ | ⅓ Air | ⅓ $CO_2$ | ⅓ Air | ⅓ Air | Air |
| Charge purity | HP | CP | HP | HP | HP | CP | CP | CP | CP |

In Table 20, the DSC data related to the glass to crystalline transformation is shown for the A2 alloy that has been melt-spun at different process parameters listed in Table 19. All of the samples were found to contain a relatively significant fraction of glass (i.e. ≥10%). The glass to crystalline transformation occurs in two stages with overlapping peaks for some alloys in the range of temperature from 400° C. to 475° C. and with enthalpies of transformation from 30 J/g to 84 J/g.

TABLE 20

DTA Data F2GS9A2 Alloy with Varying Processing Parameter Set

| Processing | Glass Present | Peak #1 Onset [° C.] | Peak #1 Temp [° C.] | Peak #1 −ΔH [J/g] | Peak #2 Onset [° C.] | Peak #2 Temp [° C.] | Peak #2 −ΔH [J/g] |
|---|---|---|---|---|---|---|---|
| PP1 | Y | 405 | 416 | 48 | 461 | 470 | 75 |
| PP2 | Y | 401 | 413 | 44 | 466 | 472 | 59 |
| PP3 | Y | — | — | — | 462 | 470 | 30 |
| PP4 | Y | 403 | 421 | 46 | 446 | 462 | 71 |
| PP5 | Y | 409 | 415 | 45 | 449 | 460 | 70 |
| PP6 | Y | 394 | 411 | 43 | 453 | 470 | 64 |
| PP7 | Y | 397 | 414 | 36 | 433 | 472 | 71 |
| PP8 | Y | 394 | 410 | 33 | 432 | 470 | 67 |
| PP9 | Y | 393 | 416 | 59 | 440 | 472 | 84 |

Melt-spun ribbons were tested by bending and in tension. One meter (1 m) of each ribbon melt-spun at different process parameters listed in Table 19 was passed through a corrugation system. The number of breaks was recorded and is shown in Table 21.

TABLE 21

Summary on Corrugation Results

| Processing | Number of Breaks per 1 meter |
|---|---|
| PP1 | 0 |
| PP2 | 0 |
| PP3 | >100 |
| PP4 | 0 |
| PP5 | 0 |
| PP6 | >100 |
| PP7 | 68 |
| PP8 | >100 |
| PP9 | 75 |

In Table 22, a summary of the tensile test results including gage dimensions, elongation, breaking load, yield stress, ultimate strength and Young's Modulus are shown for the A2 alloy that has been processed at different parameters. As can be seen the tensile strength values vary from 0.41 GPa to 2.76 GPa with the total elongation values from 0.47% to 4.49%.

TABLE 22

Tensile Properties the A2 alloy Processed at Different Parameters

| Proc-essing | Gage Dimensions (mm) W | T | L | Tensile Elongation [%] | Break Load (N) | Strength (GPa) Yield | UTS | Young's Modulus (GPa) |
|---|---|---|---|---|---|---|---|---|
| PP1 | 1.05 | 0.041 | 9 | 3.84 | 103 | 1.61 | 2.68 | 75 |
|  | 1.08 | 0.039 | 9 | 4.17 | 108 | 1.26 | 2.76 | 81 |
|  | 1.15 | 0.039 | 9 | 3.73 | 95 | 1.55 | 2.33 | 69 |
| PP2 | 1.22 | 0.036 | 9 | 3.76 | 108 | 2.07 | 2.61 | 83 |
|  | 1.39 | 0.044 | 9 | 3.57 | 140 | 1.79 | 2.58 | 77 |
|  | 1.13 | 0.035 | 9 | 4.73 | 94 | 2.55 | 2.55 | 63 |
| PP3 | 1.31 | 0.053 | 9 | 1.80 | 93 | 1.41 | 2.64 | 79 |
|  | 1.44 | 0.047 | 9 | 2.03 | 106 | 1.48 | 2.61 | 83 |
|  | 1.47 | 0.046 | 9.1 | 1.95 | 98 | 1.46 | 2.76 | 81 |
| PP4 | 1.516 | 0.055 | 9.62 | 3.86 | 212 | 2.42 | 2.48 | 93 |
|  | 1.565 | 0.054 | 9.19 | 3.90 | 207 | 1.79 | 2.61 | 94 |
|  | 1.56 | 0.054 | 9 | 4.19 | 209 | 1.47 | 1.93 | 83 |
| PP5 | 1.41 | 0.053 | 9 | 4.49 | 187 | 2.38 | 2.45 | 70 |
|  | 1.42 | 0.056 | 9 | 4.32 | 198 | 1.73 | 2.23 | 83 |
|  | 1.39 | 0.055 | 9 | 4.29 | 201 | 2.49 | 2.50 | 82 |
| PP6 | 1.39 | 0.049 | 9 | 2.03 | 99 | 1.73 | 2.51 | 80 |
|  | 1.38 | 0.054 | 9 | 1.69 | 84 | 1.58 | 2.70 | 74 |
|  | 1.3 | 0.048 | 9 | 2.01 | 96 | 1.37 | 2.22 | 90 |
| PP7 | 1.39 | 0.044 | 9 | 3.57 | 140 | 1.54 | 2.57 | 77 |
|  | 1.35 | 0.044 | 9 | 3.88 | 143 | 1.59 | 2.39 | 76 |
|  | 1.4 | 0.042 | 9 | 1.81 | 86 | 1.42 | 2.50 | 84 |
| PP8 |  |  |  | BRITTLE |  |  |  |  |
| PP9 | 1.3 | 0.036 | 9 | 1.09 | 40 | 0.75 | 0.89 | 78 |
|  | 1.47 | 0.036 | 9 | 0.47 | 21 | 0.26 | 0.41 | 71 |
|  | 1.47 | 0.033 | 9 | 0.75 | 25 | 0.42 | 0.54 | 62 |

TABLE 23

Microhardness and Ultimate Strength of Alloys

| Alloy | UTS [GPa] | Vickers Hardness [HV] | Vickers Equivalent strength [GPa] |
|---|---|---|---|
| A2 | 2.48 | 928 | 3.07 |
| B2 | 2.54 | 909 | 3.00 |
| C2 | 2.72 | 921 | 3.04 |
| D2 | 2.59 | 933 | 3.08 |

Example 4

Using high purity elements, 15 g high purity (HP) feedstocks of A2, B2, C2 and D2 alloys were weighed out according to the atomic ratio provided in Table 1. The feedstock material was then placed into the copper hearth of an arc-melting system. The feedstock was arc-melted into an ingot using high purity argon as a shielding gas. The ingots were flipped several times and re-melted to ensure homogeneity. After mixing, the ingots were then cast in the form of a finger approximately 12 mm wide by 30 mm long and 8 mm thick. The resulting fingers were then placed in a melt-spinning chamber in a quartz crucible with a hole diameter of ~0.81 mm. The ingots were melted in different atmosphere using RF induction and then ejected onto a 245 mm diameter copper wheel. Process parameters corresponding to PP4 processing specified in Table 3 were used for all four alloys. The resulting ribbons that were produced had widths which were typically 1.25 mm and thickness from 0.020 to 0.060 mm. For each alloy, the results on Vickers hardness measurements along with ultimate tensile strength are presented in Table 23. Vickers hardness measurements were performed using a diamond pyramid indenter and at a load of 50 g according to ASTM STANDARD E384-10E2. The Vickers hardness values are based on an average of 10 measurements for each alloy. Vickers equivalent strength was calculated based on well-known ratio: Strength≅⅓ Hardness and shows the potential level of the material strength. As indicated, the tensile properties shown in this application may be considered conservative as actual strength values may be in the range of 0.3 to 0.6 GPa higher due to tensile testing issues including non-uniform cross sectional geometries and errors in cross sectional thickness measurement.

Example 5

Using high purity elements, 15 g high purity (HP) feedstock of A2, B2, C2 and D2 alloys was weighed out according to the atomic ratio provided in Table 1. The feedstock material was then placed into the copper hearth of an arc-melting system. The feedstock was arc-melted into an ingot using high purity argon as a shielding gas. The ingots were flipped several times and re-melted to ensure homogeneity. After mixing, the ingots were then cast in the form of a finger approximately 12 mm wide by 30 mm long and 8 mm thick. The resulting fingers were then placed in a melt-spinning chamber in a quartz crucible with a hole diameter of ~0.81 mm. The ingots were melted in different atmosphere using RF induction and then ejected onto a 245 mm diameter copper wheel. Process parameters corresponding to PP4 processing specified in Table 3 were used for all four alloys. The resulting ribbons that were produced had widths which were typically ~1.25 mm and thickness from 0.020 to 0.060 mm.

To examine the ribbon structure, scanning electron microscopy (SEM) was performed on ribbon samples from each alloy. Melt spun ribbons were mounted in a standard metallographic mount with several ribbons held using a metallography binder clip. The binder clip containing the ribbons was set into a mold and an epoxy is poured in and allowed to harden. The resulting metallographic mount was ground and polished using appropriate media following standard metallographic practices. The structure of the samples was observed using an EVO-60 scanning electron microscope manufactured by Carl Zeiss SMT Inc. Typical operating conditions were electron beam energy of 17.5 kV, filament current of 2.4 Å, and spot size setting of 800. Energy Dispersive Spectroscopy was conducted with an Apollo silicon drift detector (SDD-10) using Genesis software both of which are from EDAX. The amplifier time was set to 6.4 micro-sec so that the detector dead time was about 12-15%. In FIGS. 3 through 6, SEM backscattered electron micrographs of cross sections are shown for A2, B2, C2 and D2 alloys, respectively. Note that no crystalline or other structural features were found on the scale of the resolution limit of the SEM. Thus since the DTA scans indicated that the material had a glass matrix, it appears likely that the SGMM structure was achieved since this structure is extremely fine and not resolvable by the SEM (i.e. transmission electron microscopy is necessary).

Example 6

Using high purity elements, 15 g high purity (HP) feedstocks of A2, B2, C2 and D2 alloys were weighed out according to the atomic ratio provided in Table 1. The feedstock material was then placed into the copper hearth of an arc-melting system. The feedstock was arc-melted into an ingot using high purity argon as a shielding gas. The ingots were flipped several times and re-melted to ensure homogeneity. After mixing, the ingots were then cast in the form of a finger approximately 12 mm wide by 30 mm long and 8 mm thick. The resulting fingers were then placed in a melt-spinning chamber in a quartz crucible with a hole diameter of ~0.81 mm. The ingots were melted and processed using the PP4 processing parameter as provided in Table 3 using RF induction and then ejected onto a 245 mm diameter copper wheel. Process parameters corresponding to PP4 processing specified in Table 3 were used for all four alloys. The resulting ribbons that were produced had widths which were typically ~1.25 mm and thickness from 0.020 to 0.060 mm. Produced ribbons were tested in tension at room temperature using microscale tensile testing. The testing was carried out in a commercial tensile stage made by Fullam Inc. All tests were performed under displacement control, with a strain rate of ~0.001 s$^{-1}$. The gage surface of the samples from each alloy was examined by scanning electron microscopy (SEM) using an EVO-60 scanning electron microscope manufactured by Carl Zeiss SMT Inc. In FIGS. 7 through 10, SEM micrographs of gage surface after tensile testing are shown for A2, B2, C2 and D2 alloys, respectively. As shown, multiple shear band formation was observed in all four alloys.

To estimate shear bands density, SEM images with ×1000 and ×2500 magnification were used. For each image, ten lines were drawn perpendicular to the shear band directions, the cross points between lines and shear bands were counted and the average density was calculated from the total number of cross points divided by the total length of draw lines. These values represent the number of shear bands per 1 meter in each alloy. Higher resolutions may provide a more accurate number of visible shear bands. Therefore, it may be expected that even higher shear band densities were actually created during tensile testing since some of the finer shear bands are quickly blunted or arrested and not easily resolved.

TABLE 24

Shear Band Density

| Alloy | Shear bands density (×10$^3$/m) | |
|---|---|---|
| | ×1,000 | ×2,500 |
| A2 | 145 | 263 |
| B2 | 96 | 243 |
| C2 | 98 | 190 |
| D2 | 150 | 148 |

Example 7

Using high purity elements, 15 g high purity (HP) feedstocks of A2, B2, C2 and D2 alloys were weighed out according to the atomic ratio provided in Table 1. The feedstock material was then placed into the copper hearth of an arc-melting system. The feedstock was arc-melted into an ingot using high purity argon as a shielding gas. The ingots were flipped several times and re-melted to ensure homogeneity. After mixing, the ingots were then cast in the form of a finger approximately 12 mm wide by 30 mm long and 8 mm thick. The resulting fingers were then placed in a melt-spinning chamber in a quartz crucible with a hole diameter of ~0.81 mm. The ingots were melted in different atmosphere using RF induction and then ejected onto a 245 mm diameter copper wheel. Process parameters corresponding to PP4 processing specified in Table 3 were used for all four alloys. The resulting ribbons that were produced had widths which were typically ~1.25 mm and thickness from 0.020 to 0.060 mm. Produced ribbons were tested in tension at room temperature using microscale tensile testing. The testing was carried out in a commercial tensile stage made by Fullam Inc. All tests were performed under displacement control, with a strain rate of ~0.001 s$^{-1}$. The gage surface of the samples from each alloy was examined by scanning electron microscopy (SEM) using an EVO-60 scanning electron microscope manufactured by Carl Zeiss SMT Inc. In FIGS. 11 through 14, SEM micrographs of gage surface after tensile testing are shown for A2, B2, C2 and D2 alloys, respectively. For each alloy, examples of Induced Shear Band Blunting (ISBB) are indicated by arrows and examples of Shear Band Arresting Interactions (SBAI) are indicated by circles. ISBB is characterized by the blunting of a single shear band far away from other shear bands. SBAI events are characterized by interaction of two or more shear bands with subsequent arresting.

Example 8

Using high purity elements, 15 g high purity (HP) feedstocks of A2, B2, C2 and D2 alloys were weighed out according to the atomic ratio provided in Table 1. The feedstock material was then placed into the copper hearth of an arc-melting system. The feedstock was arc-melted into an ingot using high purity argon as a shielding gas. The ingots were flipped several times and re-melted to ensure homogeneity. After mixing, the ingots were then cast in the form of a finger approximately 12 mm wide by 30 mm long and 8 mm thick. The resulting fingers were then placed in a melt-spinning chamber in a quartz crucible with a hole diameter of ~0.81 mm. The ingots were melted in a different atmosphere using RF induction and then ejected onto a 245 mm diameter copper wheel. Process parameters corresponding to PP4 processing specified in Table 3 were used for all four alloys. The resulting ribbons that were produced had widths which were typically ~1.25 mm and thickness from 0.020 mm to 0.060 mm. Produced ribbons were tested in tension at room temperature using microscale tensile testing. The testing was carried out in a commercial tensile stage made by Fullam Inc. All tests were performed under displacement control, with a strain rate of ~0.001 s$^{-1}$. In FIGS. 15 through 18, representative tensile stress-strain curves are shown for A2, B2, C2 and D2 alloys, respectively. All four alloys have demonstrated relatively high strength (>2.5 GPa), extensive continuous strain hardening and plastic ductility more than 2%.

Example 9

Using high purity elements, 15 g high purity (HP) feedstocks of A2 alloy were weighed out according to the atomic ratio provided in Table 1. Using ferroadditive and other readily commercially available constituents, 15 g commercial purity (CP) feedstocks (up to 10 at % impurity) of A2 alloy were weighed out according to the atomic ratio provided in Table 1. The feedstock material was then placed into the copper hearth of an arc-melting system. The feedstock was arc-melted into an ingot using high purity argon as a shielding gas. The ingots were flipped several times and re-melted to ensure homogeneity. After mixing, the ingots were then cast in the form of a finger approximately 12 mm wide by 30 mm long and 8 mm thick. The resulting fingers were then placed in a melt-spinning chamber in a quartz crucible with a hole diameter of ~0.81 mm. The ingots were melted and processed at PP2 and PP4 process parameters specified in Table 3 using RF induction and then ejected onto a 245 mm diameter copper wheel which was traveling at different tangential velocities.

The resulting ribbons that were produced had widths which were typically ~1.25 mm and thickness from 0.020 to 0.060 mm. The produced ribbons were subjected to heat treatment at different conditions listed in Table 25.

TABLE 25

Heat Treatment Parameters

| Heat Treat ID | Type | Heat Treatment Description | Temperature [° C.] | ΔT [° C.] | Time [min] |
|---|---|---|---|---|---|
| H00 | Baseline | As-melt-spun state | — | — | — |
| H01 | Isothermal | 150° below onset temperature of first peak | 252 | 150 | 10 |
| H02 | Isothermal | 100° below onset temperature of first peak | 302 | 100 | 10 |
| H03 | Isothermal | 50° below onset temperature of first peak | 352 | 50 | 10 |
| H04 | Isothermal | Midway between two peak temperatures {DSC: 10-845} | 442 | — | 10 |
| H05 | Isothermal | 50° above peak temperature of last peak {DSC: 10-845} | 496 | — | 10 |
| H06S | Step Aging | $T_{cr}$* for 10 min | 352 | — | 10 |
|  |  | $T_{cr}$* - 25° for 20 min | 327 |  | 20 |
|  |  | $T_{cr}$* - 50° for 30 min | 302 |  | 30 |
|  |  | $T_{cr}$* - 75° for 40 min | 277 |  | 40 |

*$T_{cr}$—maximal temperature determined from H03, H02 and H01 heat treatments when ribbons maintain 90% bend ability or higher.

Thermal analysis was performed on the heat treated ribbons using a NETZSCH DSC404 F3 Pegasus Differential Scanning calorimeter (DSC). Constant heating rate scans at a heating rate of 10° C./minute with samples protected from oxidation through the use of flowing ultrahigh purity argon. In Table 26, the DSC data related to the glass to crystalline transformation is shown for the heat treated alloy that has been melt-spun at PP2 process conditions specified in Table 3. The glass to crystalline transformation occurs in one or two stages in the range of temperature from 393° C. to 500° C. and with enthalpies of transformation from 63 J/g to 92 J/g. In Table 27, the DSC data related to the glass to crystalline transformation is shown for the heat treated alloy that has been melt-spun at PP4 process conditions specified in Table 3. The glass to crystalline transformation occurs in one or two stages in the range of temperature from 395° C. to 460° C. and with enthalpies of transformation from 56 J/g to 86 J/g.

TABLE 26

DSC Data For Heat-Treated Ribbons Processed at PP2 Parameters

| Heat Treatment | Glass Present | Peak #1 Onset [° C.] | Peak #1 Temp [° C.] | Peak #1 -ΔH [J/g] | Peak #2 Onset [° C.] | Peak #2 Temp [° C.] | Peak #2 -ΔH [J/g] |
|---|---|---|---|---|---|---|---|
| H00 | Y | 398 | 412 | 51 | 446 | 471 | 69 |
| H01 | Y | 393 | 417 | 47 | 436 | 497 | 85 |
| H02 | Y | 397 | 410 | 45 | 439 | 469 | 72 |
| H03 | Y | 399 | 417 | 58 | 439 | 472 | 92 |
| H04 | Y | 398 | 414 | 48 | 439 | 473 | 79 |
| H05 | Y | — | — | — | 468 | 474 | 72 |
| H06S | Y | 397 | 411 | 53 | 453 | 473 | 63 |

TABLE 27

DSC Data For Heat-Treated Ribbons Processed at PP4 Parameters

| Heat Treatment | Glass Present | Peak #1 Onset [° C.] | Peak #1 Temp [° C.] | Peak #1 -ΔH [J/g] | Peak #2 Onset [° C.] | Peak #2 Temp [° C.] | Peak #2 -ΔH [J/g] |
|---|---|---|---|---|---|---|---|
| H00 | Y | 399 | 415 | 45 | 437 | 457 | 86 |
| H01 | Y | 399 | 414 | 44 | 441 | 457 | 64 |
| H02 | Y | 397 | 413 | 45 | 436 | 457 | 76 |
| H03 | Y | 399 | 423 | 49 | 439 | 457 | 81 |
| H04 | Y | 395 | 415 | 42 | 441 | 456 | 62 |
| H05 | Y | — | — | — | 432 | 453 | 56 |
| H06S | Y | 400 | 413 | 45 | 432 | 456 | 84 |

To measure bend ductility, samples of processed ribbon were corrugated using a home built corrugation system. For each sample, a meter length of uniform ribbon was selected and then this was corrugated and the total number of breaks is listed in Tables 28-29 for the heat treated alloy processed at PP2 and PP4 parameters, respectively.

TABLE 28

Corrugation Results for Heat Treated Ribbons Processed at PP2 Parameters

| Heat Treating ID | Number of Breaks per 1 meter |
|---|---|
| H00 | 0 |
| H01 | 0 |
| H02 | 0 |
| H03 | 0 |
| H04 | 77 |
| H05 | >100 |
| H06S | >100 |

TABLE 29

Corrugation Results for Heat Treated Ribbons Processed at PP4 Parameters

| Heat Treating ID | Number of Breaks per 1 meter |
|---|---|
| H00 | 0 |
| H01 | 0 |
| H02 | 0 |
| H03 | 0 |
| H04 | 54 |
| H05 | >100 |
| H06S | 95 |

The mechanical properties of metallic ribbons were obtained at room temperature using microscale tensile testing at a strain rate of ~0.001 s$^{-1}$. In Table 30, a summary of the tensile test results including gage dimensions, elongation, breaking load, yield stress, ultimate strength and Young's Modulus are shown for the heat treated alloy that has been melt-spun at PP2 process conditions specified in Table 3. The tensile strength values vary from 1.11 GPa to 2.70 GPa with the total elongation values from 1.32% to 4.73%. In Table 31, a summary of the tensile test results including gage dimensions, elongation, breaking load, yield stress, ultimate strength and Young's Modulus are shown for the heat treated alloy that has been melt-spun at PP4 process conditions specified in Table 3. The tensile strength values vary from 2.49 GPa to 2.86 GPa with the total elongation values from 2.86% to 4.62%. The alloy is brittle after annealing at temperatures above the crystallization peak in both cases. Note that the results shown in Tables 30-31 have been adjusted for machine compliance and sample geometry.

TABLE 30

Tensile Properties of Heat-Treated Ribbons Processed at PP2 Parameters

| Heat Treatment | Gage Dimensions (mm) W | T | L | Elong. (%) | Break Load (N) | Strength (GPa) Yield | UTS | Young's Modulus (GPa) |
|---|---|---|---|---|---|---|---|---|
| H00 | 1.22 | 0.036 | 9 | 3.76 | 108 | 1.54 | 2.57 | 83 |
|  | 1.15 | 0.037 | 9 | 3.82 | 102 | 1.58 | 2.51 | 79 |
|  | 1.13 | 0.035 | 9 | 4.73 | 94 | 1.42 | 2.50 | 63 |
| H01 | 1.16 | 0.036 | 9 | 4.04 | 101 | 1.30 | 2.53 | 80 |
|  | 1.17 | 0.035 | 9 | 3.48 | 99 | 1.61 | 2.54 | 88 |
|  | 1.20 | 0.034 | 9 | 3.81 | 94 | 1.60 | 2.43 | 69 |
| H02 | 1.13 | 0.036 | 9 | 3.47 | 93 | 1.34 | 2.40 | 83 |
|  | 1.15 | 0.035 | 9 | 2.89 | 84 | 1.66 | 2.19 | 85 |
|  | 1.21 | 0.036 | 9 | 4.08 | 106 | 1.84 | 2.56 | 70 |
| H03 | 1.18 | 0.035 | 9 | 1.32 | 44 | 1.05 | 1.11 | 96 |
|  | 1.17 | 0.036 | 9 | 3.79 | 102 | 1.12 | 2.55 | 91 |
|  | 1.14 | 0.036 | 9 | 3.88 | 106 | 1.28 | 2.70 | 92 |
| H04 | 1.15 | 0.034 | 9 | 2.30 | 76 | 1.93 | 2.04 | 87 |
|  | 1.22 | 0.034 | 9 | 2.93 | 92 | 2.29 | 2.32 | 81 |
|  | 1.17 | 0.033 | 9 | 1.37 | 49 | 1.11 | 1.31 | 86 |
| H05 |  |  |  | BRITTLE |  |  |  |  |
| H06S | 1.18 | 0.035 | 9 | 3.44 | 101 | 2.23 | 2.56 | 80 |
|  | 1.12 | 0.035 | 9 | 3.16 | 94 | 2.27 | 2.51 | 84 |
|  | 1.22 | 0.038 | 9 | 1.93 | 71 | 1.51 | 1.61 | 83 |

TABLE 31

Tensile Properties of Heat-Treated Ribbons Processed at PP4 Parameters

| Heat Treatment | Gage Dimensions (mm) W | T | L | Elong. (%) | Break Load (N) | Strength (GPa) Yield | UTS | Young's Modulus (GPa) |
|---|---|---|---|---|---|---|---|---|
| H00 | 1.52 | 0.055 | 9.6 | 3.86 | 212 | 1.92 | 2.68 | 93 |
| H00 | 1.57 | 0.054 | 9.2 | 3.90 | 207 | 2.04 | 2.57 | 94 |
| H00 | 1.56 | 0.054 | 9.0 | 4.19 | 209 | 1.34 | 2.60 | 83 |
| H01 | 1.56 | 0.055 | 9.0 | 4.41 | 209 | 1.41 | 2.57 | 71 |
| H01 | 1.50 | 0.057 | 9.0 | 4.57 | 210 | 1.48 | 2.57 | 67 |
| H01 | 1.50 | 0.055 | 9.0 | 4.21 | 203 | 1.50 | 2.58 | 74 |
| H02 | 1.53 | 0.056 | 9.0 | 4.14 | 203 | 1.35 | 2.49 | 75 |
| H02 | 1.52 | 0.056 | 9.0 | 4.10 | 212 | 1.59 | 2.61 | 78 |
| H02 | 1.52 | 0.056 | 9.0 | 4.08 | 218 | 1.45 | 2.70 | 84 |
| H03 | 1.56 | 0.053 | 9.0 | 4.22 | 214 | 1.64 | 2.72 | 77 |
| H03 | 1.51 | 0.055 | 9.0 | 4.62 | 218 | 1.49 | 2.75 | 71 |
| H03 | 1.50 | 0.057 | 9.0 | 4.35 | 220 | 1.44 | 2.70 | 77 |
| H04 | 1.58 | 0.055 | 9.0 | 3.84 | 215 | 1.42 | 2.59 | 75 |
| H04 | 1.54 | 0.054 | 9.0 | 3.61 | 210 | 1.92 | 2.68 | 79 |
| H04 | 1.56 | 0.055 | 9.0 | 2.86 | 177 | 2.04 | 2.57 | 82 |
| H05 |  |  |  | BRITTLE |  |  |  |  |
| H06S | 1.49 | 0.055 | 9.0 | 4.08 | 209 | 1.55 | 2.68 | 79 |
| H06S | 1.55 | 0.052 | 9.0 | 4.03 | 219 | 2.40 | 2.86 | 75 |
| H06S | 1.53 | 0.056 | 9.0 | 3.90 | 223 | 2.10 | 2.74 | 77 |

The alloys herein may be used in a variety of applications. These include: (1) body armor (stab and ballistic protection to be worn by a person) as the alloys indicate the required flexibility and can be made relatively thin with relatively low density to remain concealable; (2) structural honeycomb configurations (array of cells separated by vertical walls, where the calls as preferably columnar and hexagonal in shape), as the alloys provide relatively high specific strength, stiffness and corrosion resistance; (3) enclosure facings such as those for portable electronics as the alloys provide relatively high scratch resistance, corrosion resistance and metallic finish); (4) transmission cable for either power or signals as the alloys may be configured to provide strength and armor (protection); (5) tire armor as the alloys may provide puncture resistance and/or stiffening; (6) footwear as the alloys may provide puncture or wear resistance; (7) composite material compositions (e.g. polymer resin based) as the alloys may provide relatively high strength, stiffness, electrical and/or thermal conductivity, or EMI shielding); (8) fibers for reinforced concrete as the alloys may provide relatively high resistance to crack formation and residual strength after the crack has formed, in addition to improvements in corrosions resistance; (9) fibers for reinforcing polymers, including thermoplastics (non-crosslinked) and/or thermoset (crosslinked) resins, as the alloys provide increased strength, stiffness, thermal or electrical conductivity, and corrosion resistance.

The foregoing description of several methods and embodiments has been presented for purposes of illustration. It is not intended to be exhaustive or to be limiting to the precise steps and/or forms disclosed, and obviously many modifications and variations are possible in light of the above teaching.

What is claimed is:

1. A method for forming a metallic alloy containing spinodal glass matrix microconstituent (SGMM) comprising:
   supplying a metallic alloy comprising Fe at a level of 45.0 atomic percent to 71 atomic percent; Ni at a level of 4.0 atomic percent to 9.0 atomic percent; B at a level of 11.0 atomic percent to 16 atomic percent; Si at a level of 0.3 atomic percent to 4.0 atomic percent, chromium at a level of 12 at % to 19 at % and does not include cobalt;
   melting said alloy; and
   forming said spinodal glass matrix microconstituent through spinodal decomposition of said metallic alloy wherein said metallic alloy upon cooling separates into two distinct phases that are different in chemical composition and physical properties, wherein said phase formation is not nucleation controlled and said SGMM structure includes one or more semicrystalline or crystalline phases wherein the semicrystalline phase comprises clusters exhibiting a largest linear dimension of 2.0 nm or less and said crystalline phase comprises clusters exhibiting a largest linear dimension of greater than 2.0 nm and a glass matrix where the structural units in said glass matrix have a size of 5 Å to 100 Å;
   wherein said alloy containing said SGMM structure has an ultimate tensile strength in the range of 0.4 GPa to 3.9 GPa and tensile elongation in the range of 0.4% to 5.5%.

2. The method of claim 1 wherein said SGGM structure is present in said alloy at a level of 5.0% to 95% by volume.

3. The method of claim 1 wherein said alloy exhibits a glass to crystalline transformation in the temperature range of 396° C. to 713° C.

4. The method of claim 1 wherein said alloy exhibits a Vickers Hardness in the range of 900 to 950.

5. The method of claim 1 wherein said alloy has a thickness of greater than 1.0 micron.

6. The method of claim 1 wherein said cooling comprises any one of melt-spinning, jet casting, hyperquenching, wire casting, planar flow casting or twin-roll casting.

7. The method of claim 1 wherein said alloy containing said SGMM structure has a thickness in the range of 0.5 mm to 5.0 mm.

8. The method of claim 1 wherein said alloy containing said SGGM structure is in the form of wire or fiber, having a diameter in the range of 1 μm to 120 μm.

* * * * *

UNITED STATES PATENT AND TRADEMARK OFFICE
CERTIFICATE OF CORRECTION

PATENT NO. : 8,986,472 B2  Page 1 of 1
APPLICATION NO. : 13/287559
DATED : March 24, 2015
INVENTOR(S) : Daniel James Branagan et al.

It is certified that error appears in the above-identified patent and that said Letters Patent is hereby corrected as shown below:

In the Claims,

Column 36, in line 46, in Claim 2, delete "SGGM" and insert -- SGMM --, therefor.

Column 36, in line 62, in Claim 8, delete "SGGM" and insert -- SGMM --, therefor.

Signed and Sealed this
Eleventh Day of August, 2015

Michelle K. Lee
*Director of the United States Patent and Trademark Office*